United States Patent [19]

Takagi et al.

[11] Patent Number: 5,544,538
[45] Date of Patent: Aug. 13, 1996

[54] HYDRAULIC CONTROLLER FOR AUTOMATIC TRANSMISSION HAVING AUTOMATIC MANUAL CONTROL AND AUTOMATIC FAILSAFE OPERATION

[75] Inventors: Akira Takagi, Obu; Fumiaki Murakami, Okazaki; Masami Fujutsuna, Kariya; Kazuyuki Natsume, Toyohashi; Masaru Suzuki, Kariya; Toshihiro Takei, Okazaki, all of Japan

[73] Assignee: Nippondenso Co., Ltd., Kariya, Japan

[21] Appl. No.: 253,570

[22] Filed: Jun. 3, 1994

[30] Foreign Application Priority Data

Jun. 4, 1993 [JP] Japan .................... 5-160350
Jan. 31, 1994 [JP] Japan .................... 6-029010

[51] Int. Cl.⁶ .......................... F16H 61/18; F16H 63/08; F16K 31/524; F16K 31/54
[52] U.S. Cl. .......................... 74/335; 74/337.5; 477/906; 137/625.23; 137/636.4; 137/596.1
[58] Field of Search .................. 74/335, 337.5; 137/596.1, 636.4, 625.23; 477/906

[56] References Cited

U.S. PATENT DOCUMENTS

| 2,349,410 | 5/1944 | de Normanville | 475/312 |
| 2,433,099 | 12/1947 | de Normanville | 74/337.5 |
| 4,226,142 | 10/1980 | Rembold et al. | |
| 5,179,867 | 1/1993 | Sakakibara et al. | |
| 5,249,476 | 10/1993 | Zaiser et al. | |

FOREIGN PATENT DOCUMENTS

| 510657 | 10/1992 | European Pat. Off. | |
| 2677098 | 12/1992 | France | |
| 4117734 | 2/1993 | Germany | |
| 59-222626 | 12/1984 | Japan | |
| 3199758 | 8/1991 | Japan | 74/335 |
| 4321869 | 11/1992 | Japan | |
| 4321868 | 11/1992 | Japan | |
| 477183 | 12/1992 | Japan | |
| 5060221 | 3/1993 | Japan | 477/906 |
| 2174158 | 10/1986 | United Kingdom | |

*Primary Examiner*—Charles A. Marmor
*Assistant Examiner*—Nathan O. Jensen
*Attorney, Agent, or Firm*—Cushman Darby & Cushman

[57] ABSTRACT

A vehicular automatic transmission (AT) hydraulic controller has an integrated valve. The integrated valve has a cylindrical cam shaft including convex and concave parts on the outer periphery thereof, and the integrated valve is connected to a motor for automatic control and a connecting part which is interlocked with an external gearshift operated by a driver. Hydraulic control of the integrated valve can be performed in two different ways, i.e., automatic control and manual control, and even if automatic control malfunctions due to an error, manual control can maintain the control of the AT and avoid any inconvenience. The structure of this integrated valve provides a high degree of design freedom and can implement a wide variety of AT functions. Accordingly, a light, compact and reliable AT equipped with both an automatic control mechanism and a manual control mechanism can be provided.

7 Claims, 16 Drawing Sheets

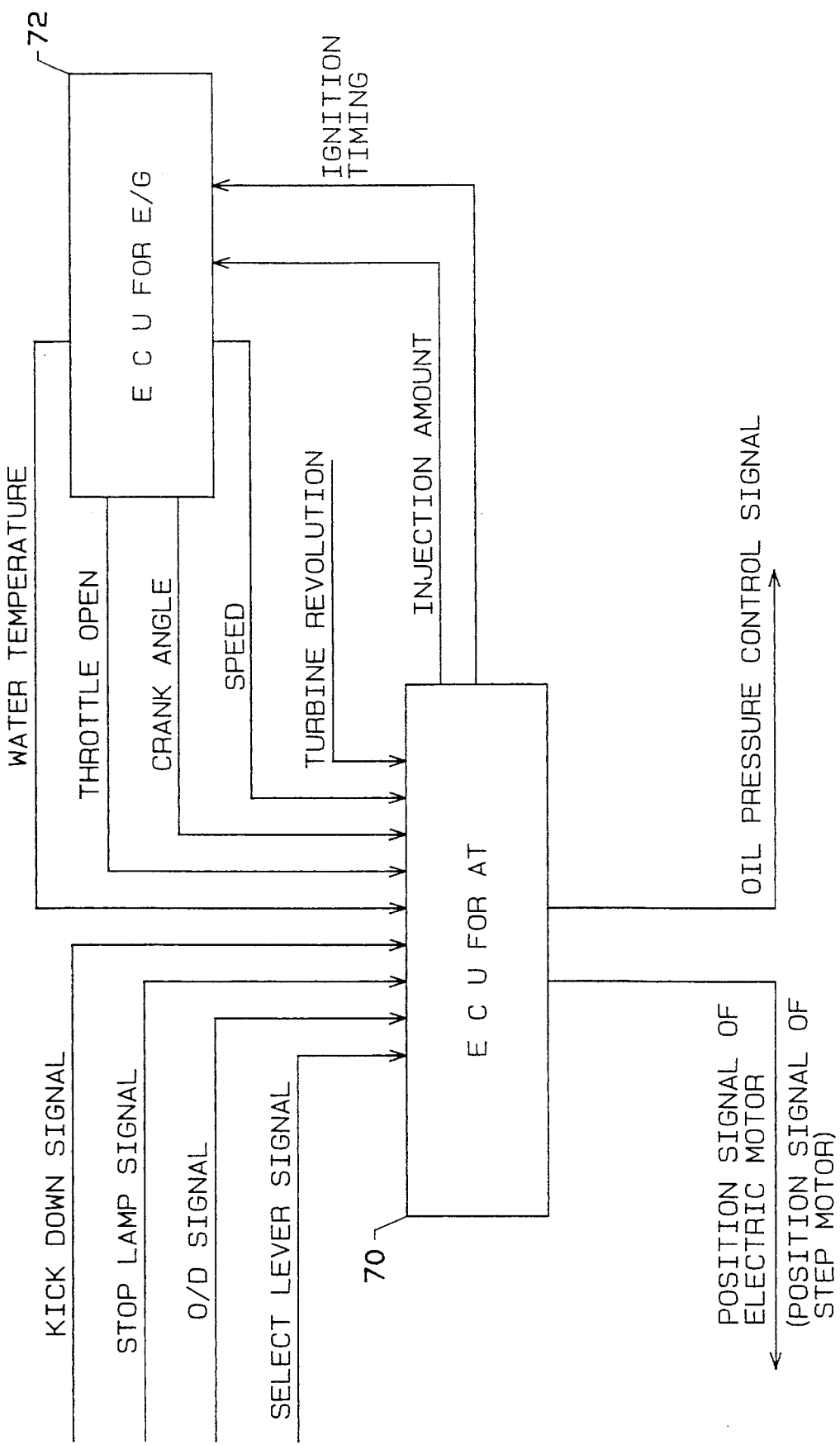

FIG. 4

$P_s$: LINE PRESSURE PORT   $D_r$: DRAIN   $P_{c1}, P_{c2}$: CONTROLLED PRESSURE PORT

| RANGE | SPOOL SPEED | SPOOL 2 (B₃) | | | | | SPOOL 3 (C₀) | | | | | SPOOL 4 (C₂) | | | | | SPOOL 5 (C₁) | | | | |
|---|---|---|---|---|---|---|---|---|---|---|---|---|---|---|---|---|---|---|---|---|---|
| | | 1st | 2nd | 3rd | 4th | FAIL | 1st | 2nd | 3rd | 4th | FAIL | 1st | 2nd | 3rd | 4th | FAIL | 1st | 2nd | 3rd | 4th | FAIL |
| UPPER SPOOL | L | $P_{c1}$ | $D_r$ | $D_r$ | $D_r$ | $D_r'$ | $P_s$ | $P_s$ | $P_s$ | $P_s$ | $P_s'$ | $D_r$ | $D_r$ | $D_r$ | $P_{c1}$ | $D_r'$ | $D_r$ | $D_r$ | $D_r$ | $D_r$ | $P_s'$ |
| | 2 | $D_r$ | $D_r$ | $D_r$ | $D_r$ | $D_r'$ | $P_s$ | $P_s$ | $P_s$ | $P_s$ | $P_s'$ | $D_r$ | $D_r$ | $P_{c1}$ | $P_{c1}$ | $P_{c1}'$ | $P_{c1}$ | $D_r$ | $D_r$ | $D_r$ | $P_s'$ |
| | D | $D_r$ | $D_r$ | $D_r$ | $D_r$ | $D_r'$ | $P_s$ | $P_s$ | $P_s$ | $P_s$ | $P_s'$ | $D_r$ | $D_r$ | $D_r$ | $P_s$ | $D_r'$ | $P_{c1}'$ | $P_s$ | $P_s$ | $P_s$ | $P_s'$ |
| | N | $D_r$ | $D_r$ | $D_r$ | $D_r$ | $P_s'$ | $P_s$ | $P_s$ | $P_s$ | $P_{c1}$ | | $D_r$ | $D_r$ | $P_{c1}$ | $D_r$ | $P_{c1}'$ | $D_r$ | $D_r$ | $D_r$ | $D_r$ | $D_r'$ |
| | R | $P_s$ | $P_s$ | $P_s$ | $P_s$ | $D_r'$ | $P_s$ | $P_s$ | $P_s$ | $P_s$ | $P_s'$ | $D_r$ | $D_r$ | $D_r$ | $D_r$ | $D_r'$ | $D_r$ | $D_r$ | $D_r$ | $D_r$ | $D_r'$ |
| | P | $D_r$ | $D_r$ | $D_r$ | $D_r$ | $D_r'$ | $P_s$ | $P_s$ | $P_s$ | $P_s$ | $P_s'$ | $D_r$ | $D_r$ | $D_r$ | $D_r$ | $D_r'$ | $D_r$ | $D_r$ | $D_r$ | $D_r$ | $D_r'$ |
| LOWER SPOOL | L | | — | — | — | | $D_r$ | $P_{c2}$ | $P_{c2}$ | $D_r$ | $D_r'$ | $D_r$ | $D_r$ | $D_r$ | $D_r$ | $D_r'$ | $D_r$ | $P_{c2}$ | $P_{c2}$ | $P_{c2}$ | $P_{c2}'$ |
| | 2 | | — | — | — | | $D_r$ | $P_{c2}$ | $D_r$ | $D_r$ | $D_r'$ | $D_r$ | $D_r$ | $D_r$ | $P_{c2}$ | $P_{c2}'$ | $P_{c2}$ | $P_{c2}$ | $P_s$ | $P_s$ | $P_s'$ |
| | D | | — | — | — | | $D_r$ | $D_r$ | $D_r$ | $D_r$ | $D_r'$ | $D_r$ | $D_r$ | $D_r$ | $D_r$ | $D_r'$ | $D_r$ | $D_r$ | $P_s$ | $P_s$ | $P_s'$ |
| | N | | — | — | — | | $D_r$ | $D_r$ | $D_r$ | $D_r$ | $D_r'$ | $D_r$ | $D_r$ | $D_r$ | $D_r$ | $D_r'$ | $D_r$ | $D_r$ | $D_r$ | $D_r$ | $D_r'$ |
| | R | | — | — | — | | $D_r$ | $D_r$ | $D_r$ | $D_r$ | $D_r'$ | $D_r$ | $D_r$ | $D_r$ | $D_r$ | $D_r'$ | $D_r$ | $D_r$ | $D_r$ | $D_r$ | $D_r'$ |
| | P | | — | — | — | | $D_r$ | $D_r$ | $D_r$ | $D_r$ | $D_r'$ | $D_r$ | $D_r$ | $D_r$ | $D_r$ | $D_r'$ | $D_r$ | $D_r$ | $D_r$ | $D_r$ | $D_r'$ |
| RANGE | SPOOL SPEED | | | | | | SPOOL 6 (B₁) | | | | | SPOOL 7 (B₀) | | | | | SPOOL 8 (B₂) | | | | |
| | | | | | | | 1st | 2nd | 3rd | 4th | | 1st | 2nd | 3rd | 4th | | 1st | 2nd | 3rd | 4th | |

FIG.5

○ ... IN OPERATION

| SHIFT POSITION | | $C_0$ | $C_1$ | $C_2$ | $B_0$ | $B_1$ | $B_2$ | $B_3$ |
|---|---|---|---|---|---|---|---|---|
| P | PARKING | ○ | | | | | | |
| R | REVERSE | ○ | | ○ | | | | ○ |
| N | NEUTRAL | ○ | | | | | | |
| D | 1st | ○ | ○ | | | | | |
|  | 2nd | ○ | ○ | | | | ○ | |
|  | 3rd | ○ | ○ | ○ | | | ○ | |
|  | O/D (4th) | | ○ | ○ | ○ | | ○ | |
| 2 | 1st | ○ | ○ | | | | | |
|  | 2nd | ○ | ○ | | | | ○ | |
|  | 3rd | ○ | ○ | ○ | | ○ | ○ | |
| L | 1st | ○ | ○ | | | | | |
|  | 2nd | ○ | ○ | | | ○ | ○ | |

FIG.6A
FIG.6B
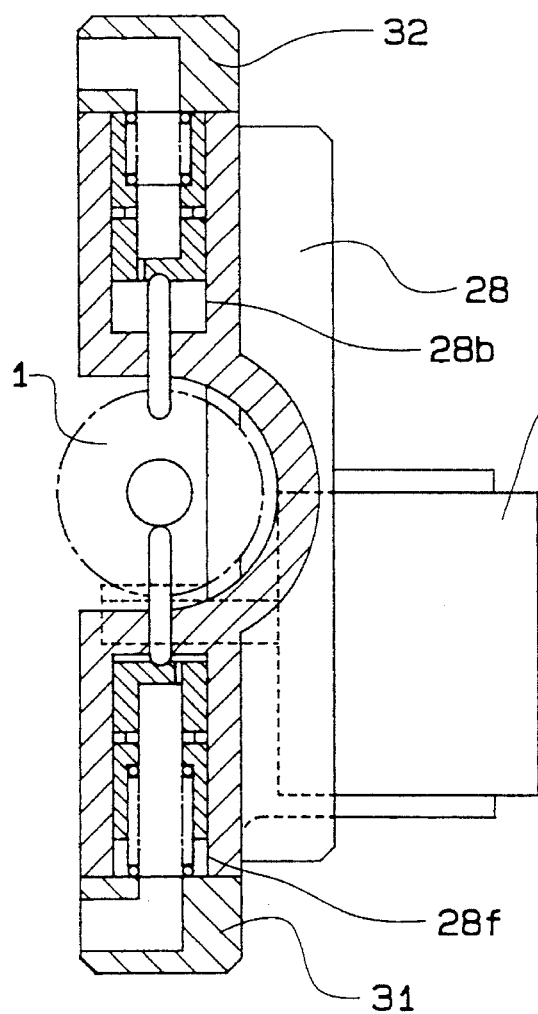
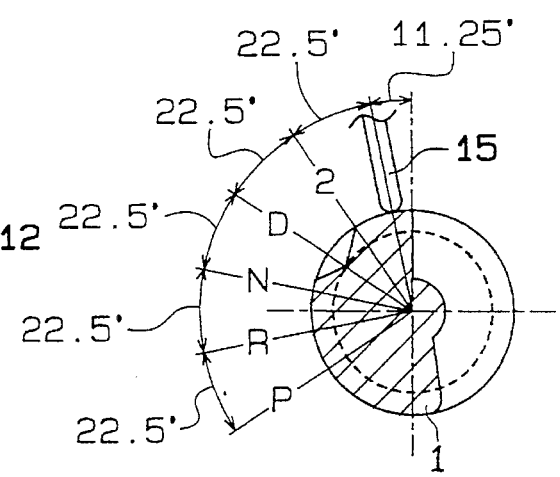

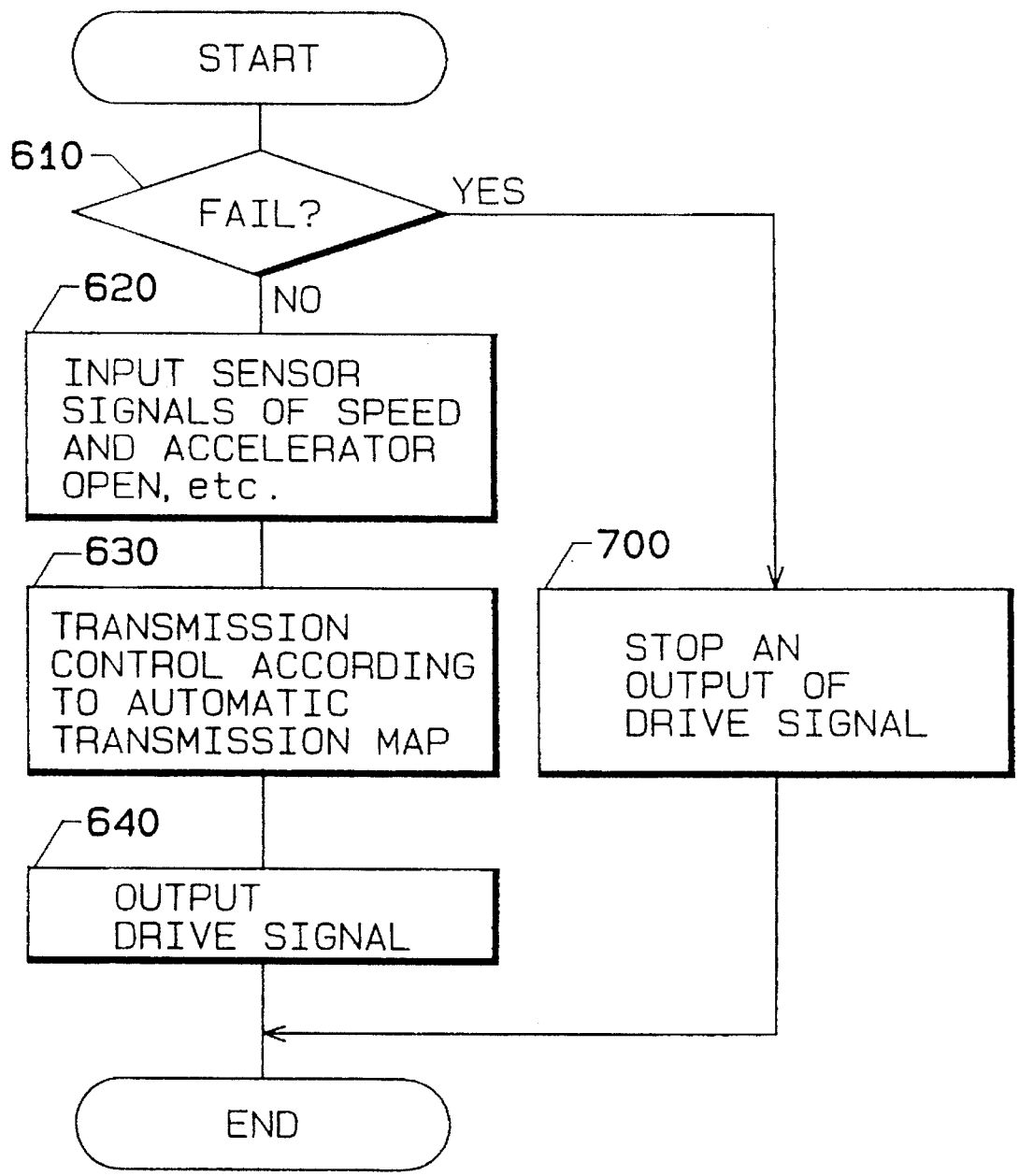

FAIL SAFE MODE POSITION
(STOPPER POSITION)
=
IN CASE FAIL OCCURS

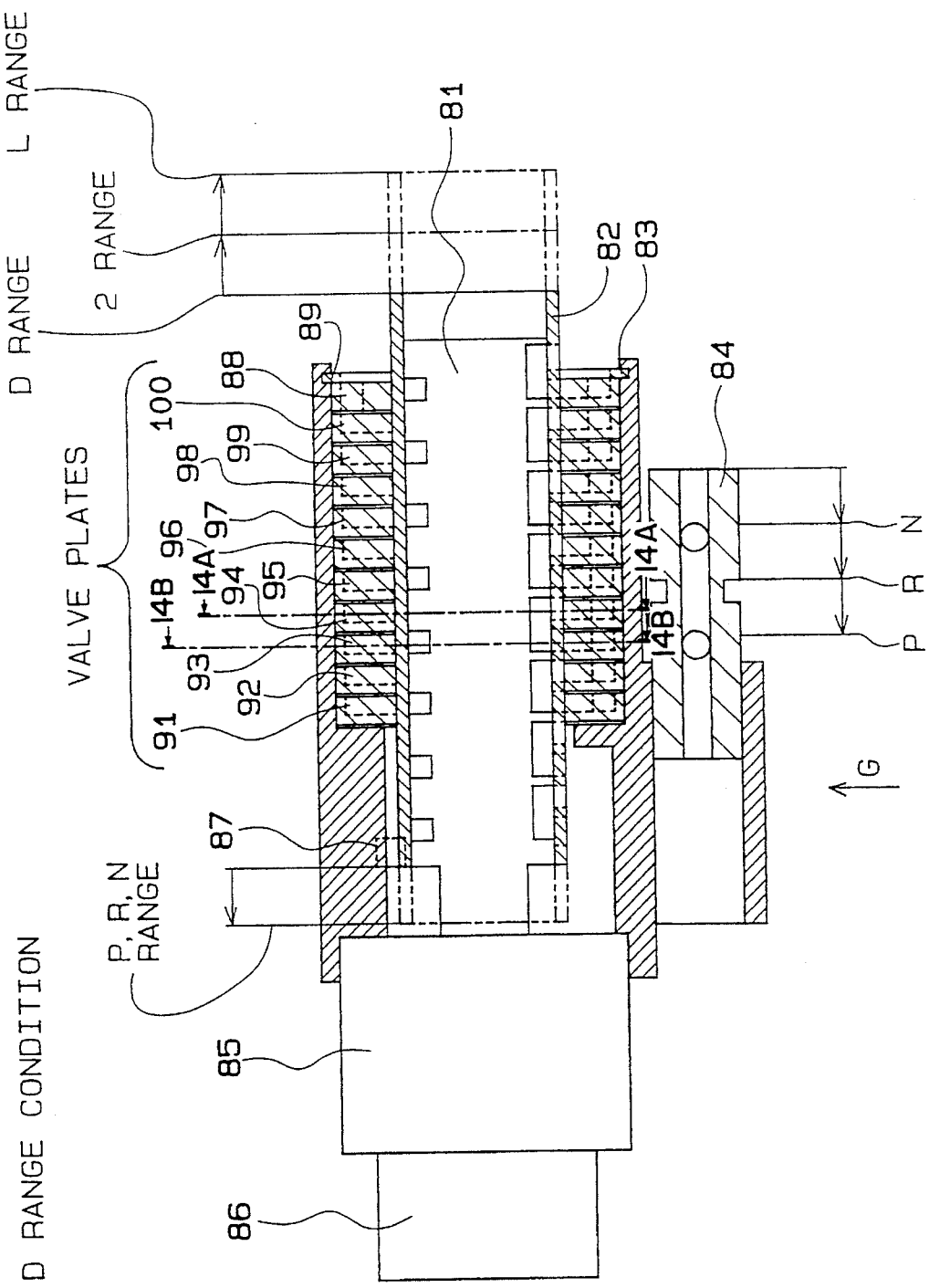

5,544,538

HYDRAULIC CONTROLLER FOR AUTOMATIC TRANSMISSION HAVING AUTOMATIC MANUAL CONTROL AND AUTOMATIC FAILSAFE OPERATION

BACKGROUND OF THE INVENTION

1. Field of the Invention

The present invention generally relates to a hydraulic controller for an automatic transmission which hydraulically controls the speed change mechanism of the automatic transmission. More particularly, the present invention relates to a hydraulic controller for an automatic transmissions of a vehicle.

2. Description of Related Art

Conventionally, an automatic transmission (AT) which is widely used in vehicles to smoothly transmit torque according to varying loads has achieved speed change control using a hydraulic circuit having a plurality of dispersed hydraulic control valves, accumulators and solenoid valves mounted therein. Therefore, such conventional ATs are large in their size and number of parts, complicated in their structure and high in their cost. In order to solve these problems, an idea has been proposed, as disclosed in Japanese Examined Patent Publication (Koukoku) No. 4-77183, that speed change is controlled by one integrated control valve. Implementation of this idea can downsize, lighten and simplify the hydraulic controller used in the conventional AT.

If the oil pressure is to be directly varied to control the oil pressure of each friction engaging element, the AT requires one hydraulic control valve for each friction engaging element, and the hydraulic controller thus becomes larger and less economical. For this reason, the integrated valve is used for hydraulic control. In order to achieve the proper oil pressure distribution according to the engagement state of required friction engaging elements, automatic speed change is achieved by smoothly switching the oil pressure with as few hydraulic control valves as possible by using the hydraulic valves of the integrated valve and by further switching the hydraulic valves with a hydraulic controller.

In a system in which dispersed hydraulic control valves control each friction engaging element for speed change control, speed change control is achieved by specifying a speed change instruction (which selects friction engaging elements within the AT to obtain the proper gear ratio) by operating a gearshift (with which a driver can select a desirable gear position freely to some extent) and an engine control computer (i.e., an electronic control unit or ECU) based on an opening of an engine throttle and vehicle speed. In this case, even if the automatic control function of the ECU fails, the driver can select forward and reverse gears and forward speed gear changes to some degree by operating the gearshift. However, in the above conventional system which controls the automatic speed change using the integrated valve, since the valve switching is controlled only by the ECU, in the event of a failure in the ECU itself or of the occurrence of an error such as a wiring disconnection, the speed change function may be completely lost.

SUMMARY OF THE INVENTION

An object of the present invention is to provide a simple, compact and controllable hydraulic controller for ATs.

Another object of the present invention is to provide a hydraulic controller for ATs, where the controller has a highly reliable integrated valve by providing a manual control function when an ECU of an automatic transmission fails.

In order to achieve the above goals, the present invention provides, in a hydraulic controller for an AT where the controller controls the engagement and disengagement of a plurality of friction engaging elements provided within the AT by switching oil passages to be connected to the friction engaging elements and thereby effect switching between a plurality of speed change positions, an integrated valve which integrates a plurality of hydraulic valves for switching the oil passages to be connected to respective friction engaging elements, a valve switching means which can switch the plurality of hydraulic valves directly and simultaneously, an automatic hydraulic valve switching means for automatically driving and controlling the valve switching means, and a manual hydraulic valve switching means for manually driving and controlling the valve switching means.

The AT automatically switches and controls a plurality of hydraulic valves by using the automatic hydraulic valve switching means and also manually switches and controls the valves by using the manual hydraulic valve switching means. Since both the automatic hydraulic valve switching means and the manual hydraulic valve switching means can switch the plurality of hydraulic valves directly and simultaneously, each friction engaging element is engaged and disengaged through each oil passages switched by the plurality of hydraulic valves, whereby a plurality of speed change positions in the AT can be switched and controlled.

Since the integrated valve is equipped with dual control means, i.e., automatic and manual hydraulic valves switching means, the present invention can downsize the hydraulic controller for ATs by using the integrated valve while maintaining the same control system as that employed by a vehicle equipped with a conventional complicated AT which does not use such an integrated valve. Furthermore, the present invention can improve the safety of an AT hydraulic controller by providing a manual control mode which can cope with a failure in the controller's automatic mode (i.e., a fail-safe means). Moreover, when a cam shaft is employed, since the hydraulic valves can be disposed symmetrically around the cam shaft, the integrated valve can assume various cross-sectional shapes such as a substantially flat plate or an approximate V shape, and the hydraulic controller according to the present invention can provide a large degree of design freedom of the AT in which the hydraulic controller is used. In addition, when the hydraulic valves are driven by cam motion through pins, the driving force applied to the pins can be reduced by taking the state of the oil pressure connecting passages to be switched into consideration, whereby a driving force source for driving cams can be downsized and consequently the whole hydraulic controller unit can also be downsized.

BRIEF DESCRIPTION OF THE DRAWINGS

FIG. 3 is a block diagram of an ECU for an AT showing the input and output of signals thereto and therefrom according to of the first embodiment present invention;

FIG. 4 a connecting operation mode table illustrating the operational state of an integrated valve according to the first embodiment of the present invention;

FIG. 5 is an operation state table of multiple disc clutches and multiple disc brakes of an AT according to the first embodiment of the present invention;

FIG. 6A is a cross-sectional view showing the integrated valve of FIG. 1, and FIG. 6B is a cross-sectional view showing the cam shaft of FIG. 1;

FIGS. 7A and 7B are flow charts showing motor control in the event of a failure of the AT ECU, according to the first embodiment of the present invention;

FIG. 13 is a cross-sectional view showing an integrated valve according to a fourth embodiment of the present invention;

DETAILED DESCRIPTION OF THE EMBODIMENTS

Figure 1:
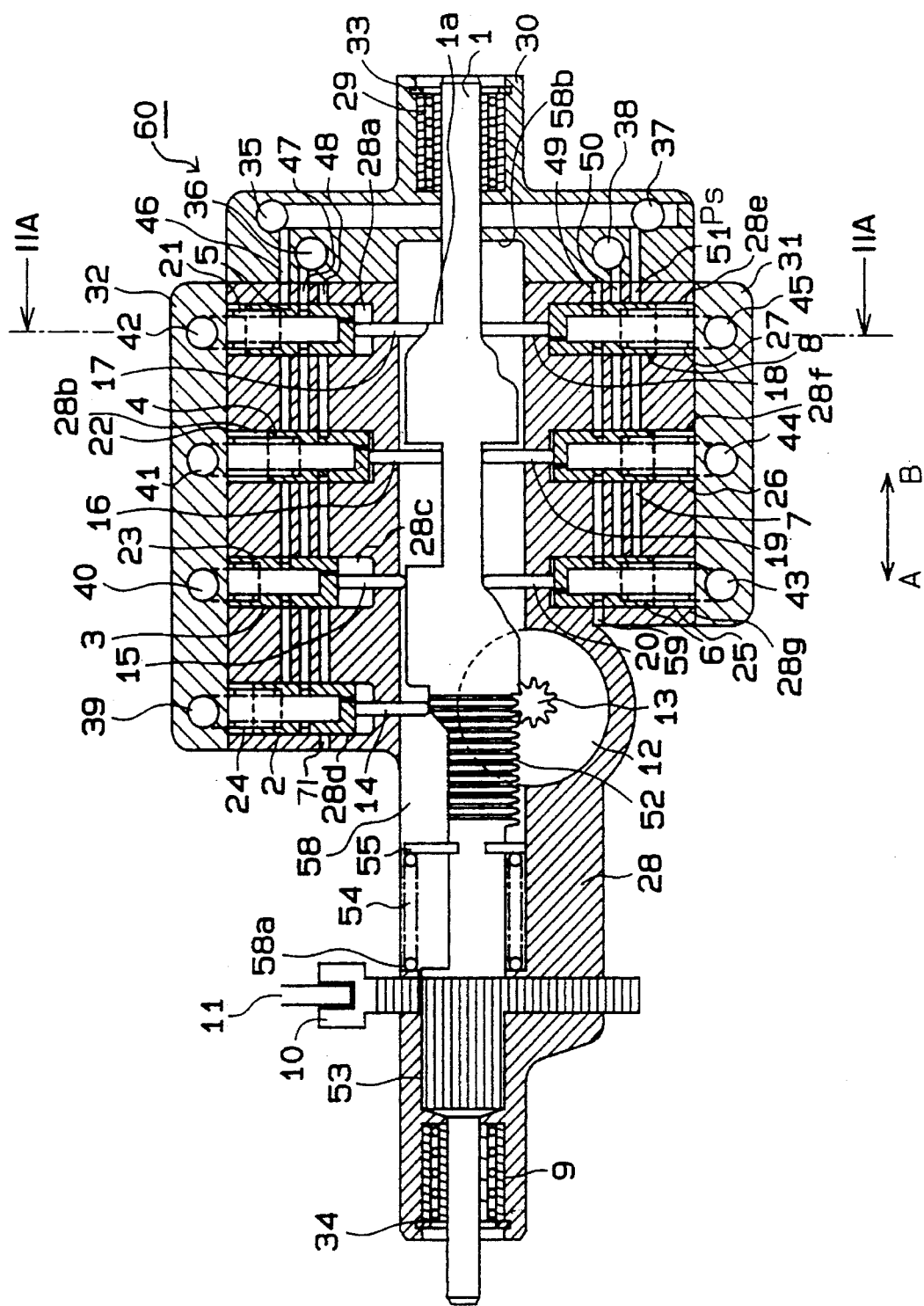
FIG. 1 is a front sectional view showing an integrated valve according to a first embodiment of the present invention.
Figure 2:
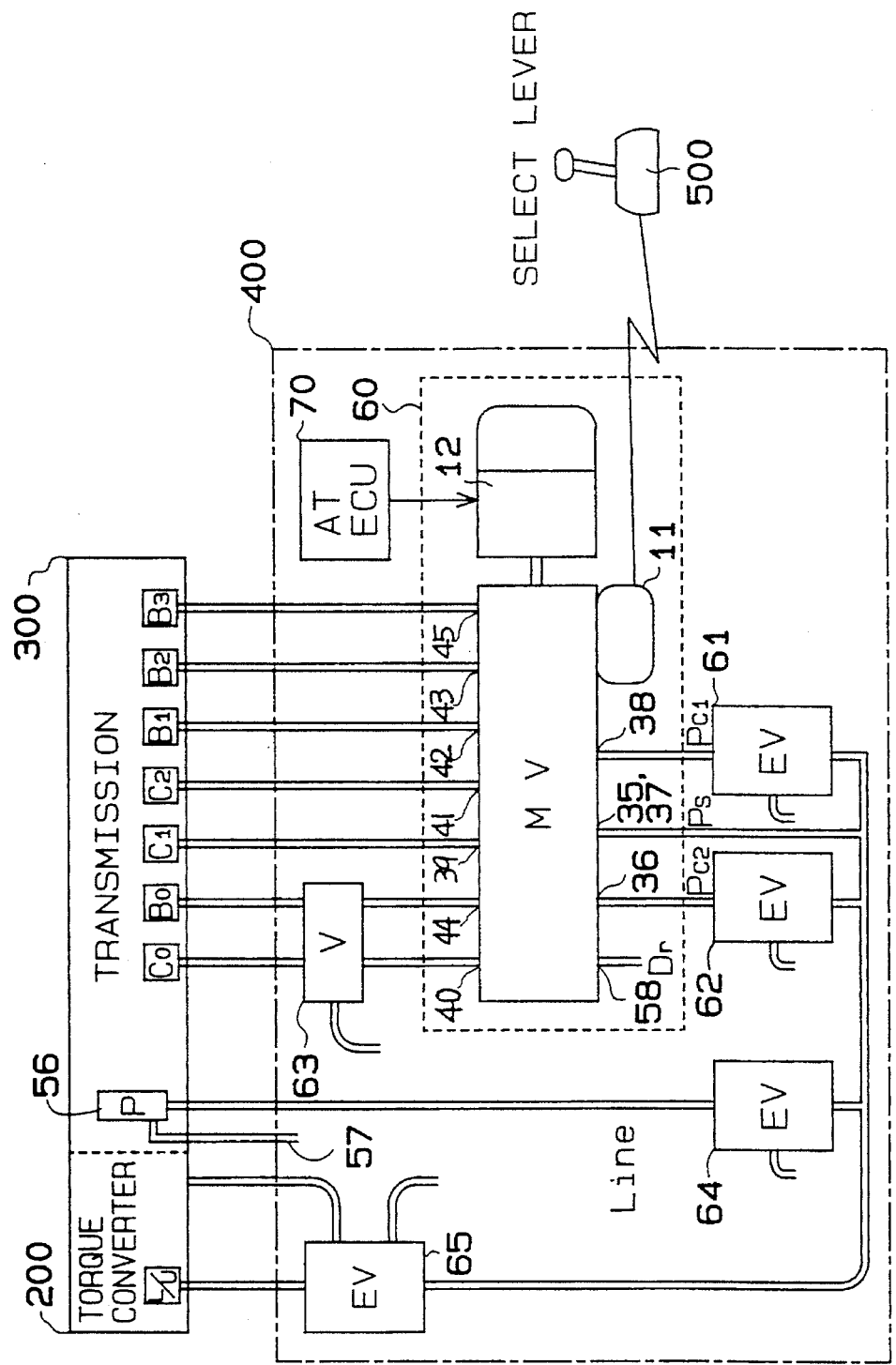
FIG. 2 is a system diagram showing an entire AT system according to the first embodiment of the present invention.

The present invention will now be described with reference to preferred embodiments as follows:

FIG. 1 is a cross-sectional view illustrating an integrated valve 60 used in a hydraulic controller according to the first embodiment. As shown in FIG. 2 and as is known in the art, in the operation of the AT for the vehicle, the engaging of gears within a transmission 300 is automatically or manually switched to transmit the torque of an engine connected to the end of a torque converter 200 (not shown) to front or rear wheels of the vehicle. FIG. 1 shows typical features of the integrated valve, while the overall structure of a hydraulic controller is represented by hydraulic controller 400 in FIG. 2. The integrated valve 60 and peripheral units thereof are disposed within the AT in an oil pan (not shown) located at the lower part of the transmission 300, and the hydraulic controller 400 within the oil pan is in the drain from a hydraulic circuit of the AT.

A hydraulic pump 56 as is known in the art directly connected to the drive shaft of the engine and rotationally driven thereby is connected to the end of a torque converter 200. The hydraulic pump 56 draws in transmission oil through a suction port 57. The transmission oil is drained from each hydraulic unit or other devices into the oil pan, and the pump 56 supplies pressurized oil to each hydraulic unit through a line pressure control valve 64. The pressurized oil supplied from the hydraulic pump 56 is high pressure pump oil. Therefore, it must be maintained at a constant high line pressure by the line pressure control valve 64, which is an electromagnetically controlled pressure control valve, and then supplied to each hydraulic unit. The hydraulic controller 400 includes two engaging oil pressure control valves 61 and 62 (collectively called an "oil pressure control valve") to maintain the line pressure supplied from the line pressure control valve 64 at a proper engaging oil pressure for the oil pressure for each friction engagement element in engagement within the transmission 300, and then to supply the controlled pressure to the integrated valve 60. The engaging oil pressure control valves 61 and 62 are connected to pressure control ports 36 and 38, respectively, (more clearly shown in FIG. 1) of the integrated valve 60. The line pressure control valve 64 is connected to line pressure ports 35 and 37 to directly supply the line pressure to the integrated valve 60, where the line pressure ports 35 and 37 are connected to each other within a side housing 30.

The line pressure and engaging oil pressure supplied to the integrated valve 60 are transmitted from connecting ports 39–45 through each corresponding spool valves 2–8 to friction engaging elements (multiple disc clutches $C_0$–$C_2$ and multiple disc brakes $B_0$–$B_3$, not shown in this Figure) within the transmission 300. Each friction engaging element is connected to gears within the transmission 300 which include planetary gears and other gears to implement the various transmission gear ratios. By selectively engaging and disengaging these friction engaging elements, the speed change gear ratio is switched to effect speed change control of the vehicle.

A connecting part 11 is mechanically connected to a gearshift 500 which is used by a driver to control the driving condition of the vehicle, such as forward, reverse, neutral and park. The line pressure is further connected to the torque converter 200 through a lockup (L/U) oil pressure control valve 65 to perform L/U slip control of the torque converter 200.

The integrated valve 60 shown in FIG. 1 includes a housing 28, side housing 30 and port cases 31 and 32. A substantially cylindrical cam shaft 1 is mounted within a hollow part 58 substantially in the center of the housing 28. The cam shaft 1 holds bearing parts which are rotatably and fittingly inserted through bearings 9 and 29, e.g., ball bearings or roller bearings, at each end thereof. The outer periphery of the cam shaft 1 includes convex and concave parts serving as cams to shiftably drive the spool valves 2–8. Furthermore, the cam shaft 1 has a rack gear 52 disposed on a part of the outer periphery thereof in the axial direction thereof, where the rack gear 52 engages with a pinion gear 13 mounted on the spindle of a stepping motor 12. In this arrangement, the cam shaft 1 is shiftably driven in the axial direction (as indicated by arrows A and B in FIG. 1) by the stepping motor 12. Gear grooves extend along the outer periphery of the cam shaft 1 so that the rack gear 52 on the cam shaft 1 and the pinion gear 13 cannot be disengaged even if the cam shaft 1 rotates in the self-centered peripheral direction.

The bearings 9 and 29 support the cam shaft 1 so that the cam shaft 1 can freely rotate and freely shift in the axial direction. A pinion gear 53 is formed on the outer periphery of a distal end of the cam shaft 1. The pinion gear 53 engages with a rack gear 10. The rack gear 10 is mechanically connected to the connecting part 11 which is interlocked with the external gearshift 500 operated by a driver.

The bearing 9 is mounted on a distal end of the housing 28 with a circlip 34, while the bearing 29 is mounted on the side housing 30 with a circlip 33. A return spring 54 is set into the outer periphery of the cam shaft 1. The return spring 54 contacts the left end surface 58a of the hollow part 58 within the housing 28 at one end, and contacts a spring stopper 55 fixed on the cam shaft 1 on the other end. The return spring 54 energizes the cam shaft 1 in the direction show by arrow B in FIG. 1 so that an end la of the cam shaft 1 can contact an end surface 58b of the hollow part 58.

The spool valves 2–8 for switching oil passages are provided within the housing 28 and are arranged in a row at both sides of the cylindrical cam shaft 1 in a vertical direction relative to the cam shaft 1. The spool valves 2–8 are slidably inserted into cylindrical holes 28a–28g respectively, which are provided within the housing 28 in the axial direction thereof.

Figure 11A:
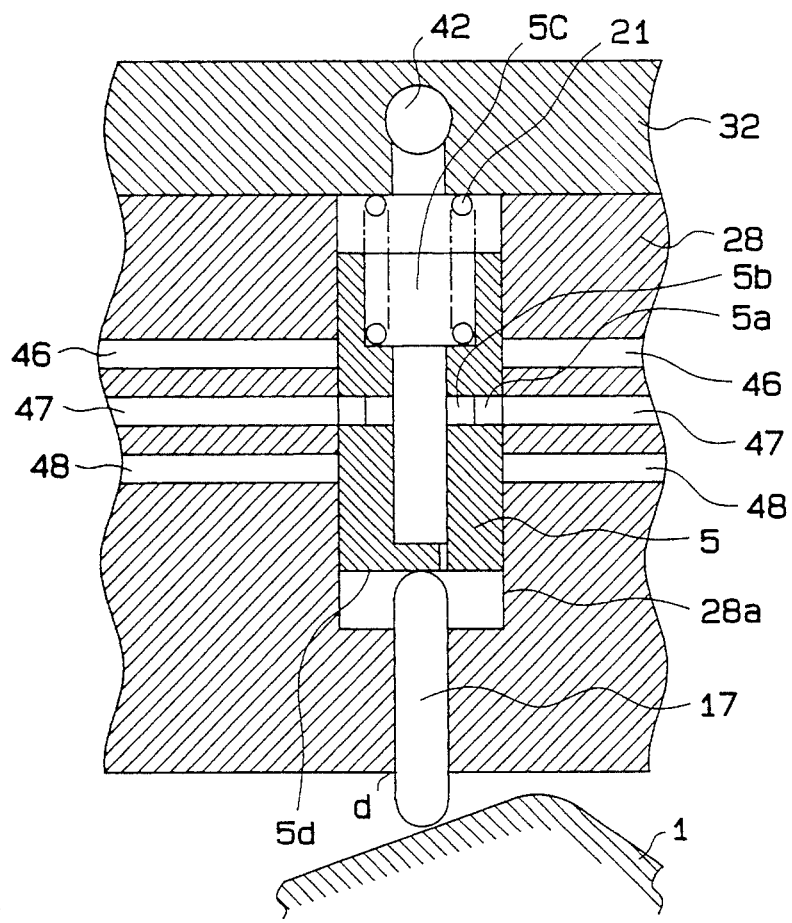
FIG. 11A is a cross-sectional view of the spool valve taken along line 11A—11A in FIG. 1.

The structure of the spool valves 2–8 will now be described. As shown in FIG. 11A, each of the spool valves 2–8 is cylindrical and has a groove formed in the central part of the outer periphery thereof (e.g., a groove 5a is formed in the spool valve 5 shown in FIG. 11A) and a hole part (e.g., the spool valve 5 shown in FIG. 11A has a hole part 5b). The hole part is connected to an internal cylindrical part (e.g., an internal cylindrical part 5c of the spool valve 5 shown in FIG. 11A) provided within the groove, and is connected to ports 46–51 which are further connected to cylindrical holes 28a14 28g. Each of the internal cylindrical parts 2c–8c provided within the corresponding one of the spool valve 2–8 is open at one end for connection to a corresponding one of the connection ports 39–45 provided within the port case 31 or 32.

A corresponding one of pins 14–20 (e.g., pin 17) is slidably inserted into the housing 28 between the cylindrical cam shaft 1 and the unopened bottom part (e.g., an end surface 5d of the spool valve 5 in FIG. 11A) vertically relative to the longitudinal axis of the cylindrical cam shaft 1 to transmit the cam motion of the cam shaft 1 to each of the spool valves 2–8 (e.g., a spool valve 5). As the spool valves 2–8 slide within the corresponding cylindrical holes 28a–28g, a pressure relief hole is provided at the closed bottom part of each of the spool valves 2–8, which each of the pins 14–20 contacts, to ensure smooth sliding of the spool valves 2–8. The pressure relief hole in each of the spool valves 2–8 is designed to balance the oil pressure within each of the spool valves 2–8 and the oil pressure working against the surface of the closed bottom part of each of the spool valves 2–8 by supplying the internal oil thereof also to the unopened bottom part thereof. The spool valves 2–8 are pressed against the side of the cylindrical cam shaft 1 together with the pins 14–20 by springs 21–27, and sealed within the cylindrical holes of the housing 28 by the port cases 31 and 32 fixed to the housing 28 with bolts (not shown) so that the spool valves 2–8 do not spring out of the housing 28.

The side housing 30 includes the line pressure ports 35 and 37 to receive the line pressure (high pressure oil) from the line pressure control valve 64. The line pressure is transmitted from the line pressure ports 35 and 37 to the line pressure passages 46 and 51 respectively, which constitute oil pressure connection passages. The line pressure connecting passage 46 is provided so that line pressure can be supplied to the cylindrical holes 28d, 28c, 28b and 28a into which the spool valves 2, 3, 4 and 5 are inserted respectively and correspondingly. On the other hand, the line pressure passage 51 is so provided that the line pressure can be supplied to the cylindrical holes 28g, 28f and 28e into which the spool valves 6, 7 and 8 are inserted respectively and correspondingly.

When each of the spool valves 2–8 is shiftably driven within the corresponding one of the cylindrical holes 28a–28g by the cam shaft 1, and when the groove and hole of each of the spool valve 2–8 have been positioned facing the opening position of each of the cylindrical holes 28d, 28c, 28b and 28a of the line pressure passage 46 or the opening position of each of the cylindrical holes 28g, 28f and 28e of the line pressure passage 51, the line pressure supplied to each of the line pressure passages 46 and 51, $P_s$, is supplied to the cylindrical part within each of the spool valves 2–8 through the groove and hole of each of the spool valves 2 to 8, and further supplied to the friction engaging elements through the respective connecting ports 39–42 of the port case 32 and the respective connecting ports 43–45 of the port case 31. The pressure control ports 36 and 38 to which the regulated engaging oil pressure (or control pressure) is supplied are provided within the side housing 30. The control pressure connecting passages 47 and 50 extend from the pressure control ports 36 and 38. The pressure connecting passages 47 and 50 are respectively provided in parallel with the line pressure passages 46 and 51 through which the regulated engaging oil pressure (or control pressure) is supplied to each of the spool valves 2–8 in the same way as the line pressure is supplied to the spool valves 2–8, and is further supplied therefrom to each friction engaging element. The pressure control ports 36 and 38 are not connected to each other within the side housing 30, however, and the engaging oil pressure supplied from the engaging oil pressure control valve 62 to the pressure control port 36 is supplied only to the spool valves 2–5 which are connected to the control pressure connecting passage 47. In the same manner, the engaging oil pressure supplied from the engaging oil pressure control valve 61 to the pressure control port 38 is supplied only to the spool valves 6–8 which are connected to the control pressure connecting passage 50.

As a result, the engaging oil pressure supplied from the engaging oil pressure control valve 61 is supplied only to the multiple disc brakes $B_1$, $B_0$ and $B_2$, and the engaging oil pressure supplied from the engaging oil pressure control valve 62 is supplied only to the multiple disc clutches $C_0$, $C_2$ and $C_1$.

In addition, there are oil pressure connecting passage connected to drains at the outside of the housing 28, i.e., drain pressure connecting passages 48 and 49 (also called "drain pressure ports" or simply "drains"), provided in parallel with the control pressure connecting passages 47 and 50 within the housing 28. When the grooves of the spool valves 2–8 are connected to these drain pressure connecting passages 48 and 49, the pressure oil within the friction engaging elements connected to the spool valves 2–8 is drained from drain ports 59 and 71. As shown in FIG. 1, these drain pressure connection passages 46–48 and 49–51 are arranged so that the passages nearest to the cam shaft 1 are the drain pressure connection passages 48 and 49, the next nearest to the cam shaft 1 are the control pressure connecting passages 47 and 50, and the farthest from the cam shaft 1 are the line pressure connecting passages 46 and 51.

Of all the connecting ports 39–45 connected to the transmission 300, if both ports 40 and 44 connected to the multiple disc clutch $C_0$ and multiple disc brake $B_0$, respectively, which are installed within the transmission 300 are operated simultaneously, transmission 300 would malfunction and may be internally damaged. To prevent these ports 40 and 44 from simultaneously being engaged, a dual engagement preventing valve 63 is connected to both of ports 40 and 44 (FIG. 2). The other connecting ports 39, 41, 42, 43 and 45 are connected to the other multiple disc clutches $C_1$ and $C_2$ and the multiple disc brakes $B_1$, $B_2$ and $B_3$, respectively. The multiple disc clutches $C_0$–$C_2$ and the multiple disc brakes $B_0$–$B_3$ are selectively engaged and disengaged by the oil pressure supplied from the connecting ports 39–45 to switch the connection of a plurality of speed change modes within the transmission 300 for AT control. It should be noted that the multiple disc brakes $B_0$–$B_3$ are friction elements similar to the multiple disc clutches $C_0$–$C_2$, and the multiple disc brake is the same friction element as the multiple disc clutch and has a structure where one side of the multiple disc clutch is fixed to the body of the transmission 300.

The cylindrical cam shaft 1 shown in FIG. 1 is controlled by the command sent from an electronic control unit (ECU) to AT 70. When the cam shaft 1 is shifting and axially driven by the stepping motor 12, the positions of the spool valves 2–8 are controlled by the convex and concave parts formed on the outer periphery of the cam shaft 1 through the pins 14–20. Accordingly, the grooves provided on the spool valves 2–8 are connected to each of the connecting passages 46–51, and the required oil pressure is transmitted to each of the connecting ports 30–45. FIG. 4 is a table showing the combination of connections of each of the spool valves 2–8 with the line pressure port $P_s$, drain $D_r$ and control pressure port $P_{c1}$ connected to the line pressure control valve 61, and control pressure port $P_{c2}$ connected to the line pressure valve 62 according to the range and speed change range of the gearshift 500.

As shown in FIG. 3, the ECU for AT 70 receives a downshift signal for shifting the spool stage to the lower stage for acceleration and a gearshift signal indicating the position of the gearshift 500. The ECU for AT 70 also receives signals from an electronic control unit (ECU) for engine 72 and outputs a motor position signal for driving the stepping motor 12 while exchanging data with the ECU for the engine 72. The ECU for AT 70 also outputs each pressure control signal to the pressure control valves 61, 62, 64 and 65. Among the data to be exchanged between the ECU for engine 72 and the ECU for AT 70 are, as shown in FIG. 3, radiator water temperature, throttle opening, crank shaft crank angle, vehicle speed and turbine rpm.

Since the cylindrical cam shaft 1 is connected to the gearshift 500 through the connecting part 11, when the position of the gearshift 500 is manually selected by the driver, the cylindrical cam shaft 1 rotates on its axis with the rack 10 which is connected to the connecting part 11. Due to the rotation of the cylindrical cam shaft 1, the pins 14–20 contacting the cam shaft 1 are shiftably driven according to the convex and concave parts of the outer periphery of the cam shaft 1 (FIG. 6B), whereby the respective spool valves 2–8 are controlled.

FIG. 6B, for example, shows a cross-sectional view of the cam shaft 1 axially cut across with the spool valve 3 in the fourth speed position and the gearshift 500 in the L (forward, low gear) position. The pin 15 in contact with the spool valve 3 is contacting the cam shaft 1 at the maximum diameter position thereof. In this position, the spool valve 3 is thrust upwards to the maximum extent, and, as a result, the spool valve 3 is in a position where the spool valve 3 is connected to the line pressure port $P_s$, and the line pressure is supplied to the multiple disc clutch $C_0$ which is connected to the spool valve 3.

When the gearshift 500 is shifted to 2 (forward, second speed), D (forward, automatic speed change), N (neutral), R (reverse) and P (park) in that order, the cam shaft 1 is rotated by 22.5° per shift through the connecting part 11, which is connected to the gearshift 500, and the rack gear 10. Due to this rotation of the cam shaft 1, the tip of the pin 15 slides in the rotational direction along the convex and concave parts on the outer periphery of the cam shaft 1. In FIG. 6B, the pin 15 shifts to the axial center thereof only in the D range when the spool valve 3 is shifted to a position where the spool valve 3 is connected to the control pressure connecting passage 47 and the engaging oil pressure is supplied to the clutch $C_0$.

In the other ranges, as is in the L range, the spool valve 3 is shifted to a position where the spool valve 3 is connected to the line pressure port $P_s$. This state is shown in FIG. 4 by the port state in each range of the spool valve 3 in the fourth speed position.

The other spool valves are also arranged for similar movement.

Since the cylindrical cam shaft 1 is also controlled by the ECU for AT 70, the signal from the gearshift 500 is inputted into the ECU for AT 70. For this reason, the cylindrical cam shaft 1 includes convex and concave parts both in axial and peripheral directions on the shaft side surface, and the shapes of the convex and concave parts are designed to effect the positions of the spool valves 2–8 determined by the oil pressure connecting mode shown in FIG. 4. The operational states of the respective multiple disc clutches $C_0$–$C_2$ and multiple disc brakes $B_0$ to $B_3$ for the AT as described above are as shown in FIG. 5.

Although the gearshift 500 is manually driven in the peripheral direction in the first embodiment, it goes without saying that the same effect can be obtained where the gearshift 500 is automatically driven in the axial direction by means of the stepping motor 12.

The convex and concave parts of the cylindrical cam shaft 1 shown in FIG. 1 may be provided not only by directly formation on the surface thereof but also by fitting a cam ring having an outer periphery appropriately formed over the cam shaft 1. In the latter case, it is easier to implement a change in the number of the ports or a change in the combinations of the ports. For example, in FIG. 1, when the housing 28 is divided into blocks around the respective cylindrical holes in which the respective spool valves 2–8 are housed and these blocks are stacked in the axial direction of the cam shaft 1 (not shown in FIG. 1), the above change can easily be accomplished. In this arrangement, the integrated valve 60 is characterized by the stacking of as many blocks as are required by the number of ports, where a block consists of an oil pressure valve and a housing thereof. As shown in FIGS. 1, 6A and 6B, when the spool valves 2–8 are arranged at both sides of the cam shaft 1, the integrated valve 60 is compact and almost flat, and can easily be installed within the oil pan due to large amounts of vertical clearance.

Generally, the gearshift 500 has six gear positions: P (parking), R (reverse), N (neutral), D (drive), 2 (second gear) and L (low gear). Since speed change is not made in the P range and N range positions, the transmission 300 is designed so that even if an automatic speed change is made, the torque is not transmitted to the rest of the drive train.

Next, speed change in the D range position will be described. The principles of this description are also applicable to the other driving ranges.

In the manual D range position, the respective spool valves 2–8 are set to their respective oil pressure connecting modes through the corresponding pins 14–20 shifted by the convex and concave parts of the cam shaft 1, where oil pressure modes are determined by the connecting ports in the D range line in the table given in FIG. 4. When a first speed position speed change command is provided to the cylindrical cam shaft 1 of all the four gear modes of the vehicle speed by the ECU for AT 70, then as shown in FIGS. 4 and 5, the multiple disc clutch $C_0$ receives the line pressure from the line pressure port 35 ($P_s$ in FIG. 4) through the line pressure connecting passage 46, the groove of the spool valve 3, and the connecting port 40, and becomes operational. In the same way, the multiple disc clutch $C_1$ receives the control pressure from the pressure control port 36 ($P_{c1}$ in FIG. 4) through the control pressure connecting passage 47, the grooves of the spool valves 5, and the connecting port 42, and the control oil pressure is adjusted by the engaging oil pressure control valves 61 and 62 according to the vehicle speed. The multiple disc clutch $C_2$ and the multiple disc brake $B_0$ are connected to the drain pressure connecting passage 48 ($D_r$ in FIG. 4), and the multiple disc brakes $B_1$–$B_3$ are connected to the drain pressure connecting passage 49. It should be noted that the codes in FIG. 4 denote the types of supply ports connected to the corresponding spool valves 2–8. In FIG. 4, though $P_{c1}$ and $P_{c2}$ have different codes due to the use of two different engaging oil pressure control valves 61 and 62, the same applicable pressure valve range (i.e., the range from the line pressure as the maximum to the lower pressure level). Furthermore, the spool 2, for example, in FIG. 4 means the spool valve 2.

When the ECU for AT 70 gives a first to second gear position speed change command to the cylindrical cam shaft 1, the cylindrical cam shaft 1 is shifted by the step motor 12 to the second gear position and the respective spool valves 2–8 are shifted accordingly. As a result, as shown in the boxes where "D range" and "2nd" meet each other in FIG. 4, the multiple disc clutch $C_1$ is connected to the line pressure port 46 ($P_s$), the multiple disc brake $B_2$ is connected to the control pressure connecting passage 50 ($P_{c2}$), and the other multiple disc clutches $C_0$, $C_2$ and $C_3$ and multiple disc brakes $B_0$, $B_1$ and $B_3$ are maintained in the same state as in the first gear position. The multiple disc clutches $C_0$–$C_3$ and multiple disc brakes $B_0$–$B_3$ within the transmission 300 are operated at an oil pressure determined by these gear positions so that they are ready to transmit the torque at a different speed change ratio (i.e., the second gear ratio). In this way, the control state is selected so that the transmission 300 implements the functions of the AT. Other operations are controlled in the same way as above.

When the gearshift 500 is manually operated to change the gear position, the cylindrical cam shaft 1 is rotated by the connecting part 11, which is interlocked with the gearshift 500, whereby the positions of the respective spools 2–8 are switched, and the oil pressure connecting modes as specified by the ranges in FIG. 4 are established. At this time, the step motor 12 controlled by the ECU for the AT 70 slides the cylindrical cam shaft 1, the oil pressure connecting mode according to the vehicle speed is established, and automatic control is maintained.

Now, a description of the fail-safe function will be given. As failures in a vehicle generally occur unexpectedly and may occur while the vehicle is moving, it is necessary to cope with the occurrence of such failures. The failures referred to herein do not include failures so extensive that the mechanism itself is mechanically damaged, but to failures in which the automatic control malfunctions. The fail-safe function is set so that if the automatic control function malfunctions due to some cause, the gear shift could be manually operated. Generally, as seen in conventional vehicles, the fail-safe function for an AT is set to maintain the speed change state unchanged or to shift the same to the fourth speed position (i.e., the high-speed side). If a downshift occurs in the event of a failure, inertial engine braking may suddenly occur, and a dangerous speed change shock may be caused. Without exception, therefore, the fail-safe function is set to up-shift the gear to the high-speed side in the event of a failure to avoid any possible speed change shock.

In FIG. 4, there is a certain range of the oil pressure connecting modes which are used in normal situations. In the multiple disc clutch $C_0$ (spool valve 3), for example, only the oil pressure connecting modes framed by a solid thick line are necessary. That is, in the L range, the required gear positions are only the first speed and the second speed positions, and as long as the transmission is in normal operation, the gear will not be shifted to the third speed position or the fourth speed position. In the same way, in the 2 range, the required gear positions are only the first, the second and the third positions, and the gear will not be shifted to the fourth speed position. In the N, R and P ranges, the gear will not be shifted to any position other than the first position. Accordingly, in the present invention, considering the above and to implement a fail-safe operation in the event of a failure, connecting modes for the unused speed change positions are set as shown in FIG. 4. That is, the same connecting states as the connecting modes of the respective ranges framed by a solid thick line are set for the high-speed side connecting modes. In the L range, for example, the second, or the highest-speed connecting mode $P_s$ is set for the unused third and fourth speed positions. Such settings are used with the 2, D, N, R and P ranges as well to implement the fail-safe function.

In this embodiment, in addition to the above, the fail-safe mode positions are also set for the speed change mode side, i.e., the side of axial shift of the cam shaft 1 ("FAIL" columns in FIG. 4). The effects of these fail-safe mode positions will be described later. First, the fail-safe function will be described for a case where the fourth speed position is set to the fail-safe position.

When the ECU for AT 70 determines that some failure has occurred, the ECU for AT 70 shifts the cylindrical cam shaft 1, which has determined the speed change state, to the fail-safe position (i.e., the fourth speed position) using the step motor 12. Even if the automatic control malfunctions, by forcedly fixing the speed change position in the fail-safe position since the connecting modes have been set to the fourth position, or the high-speed position, in the respective ranges as described above, the range shift can be made manually.

Figure 7A:
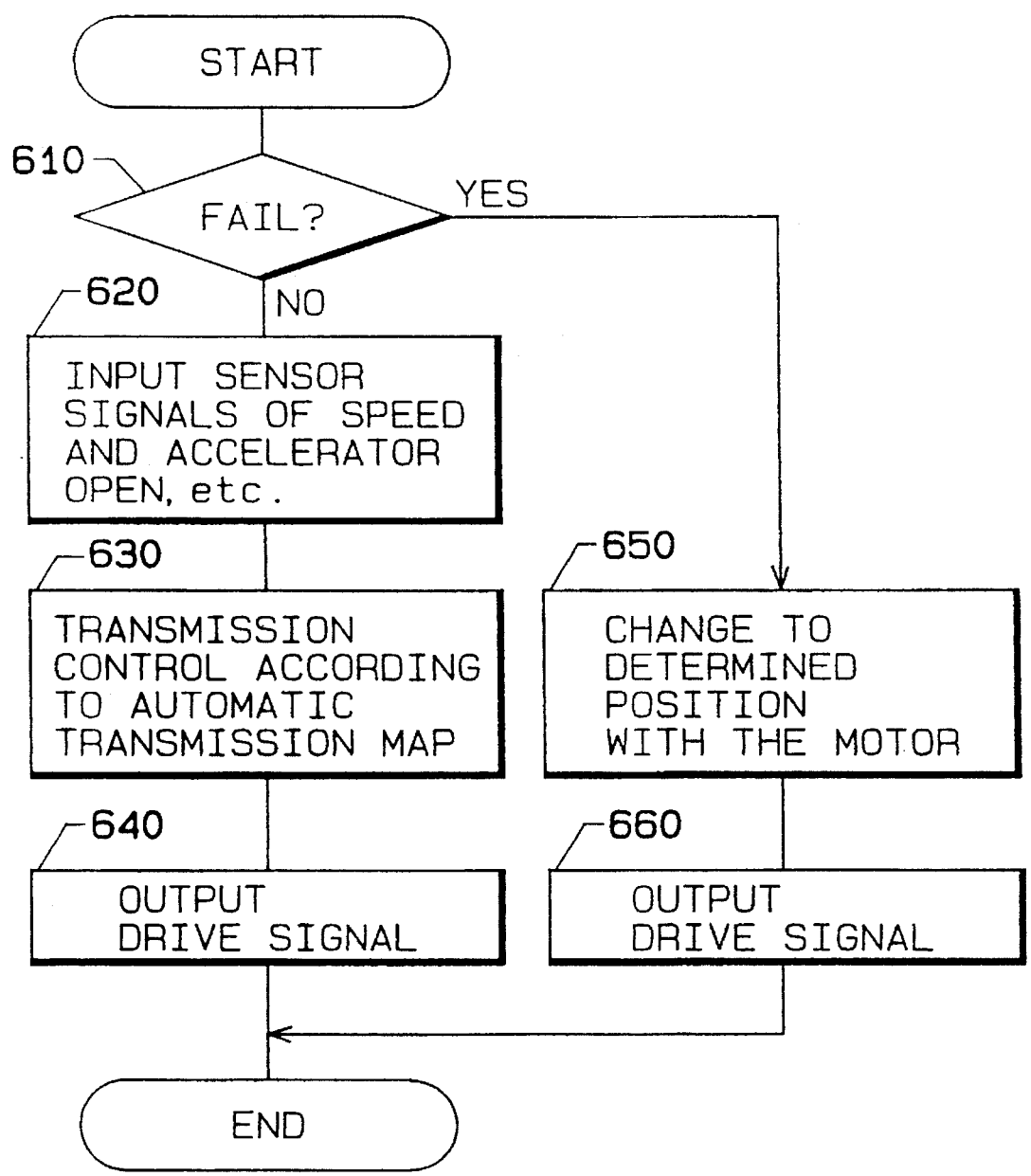

FIG. 7A shows a schematic flowchart related to a determination of failure for all the automatic control process programs of the ECU for AT 70. The ECU for AT 70 determines whether a failure has occurred or not in Step 610 in FIG. 7A based on the error signals received from various sensors and discrepancies in computations. When the ECU for AT 70 determines that a failure has occurred, the ECU for AT 70 proceeds to Step 650 and shifts the cam shaft 1 to the fail-safe position (i.e., the fourth position). In the fail-safe position, though speed change equivalent to the automatic speed change can not be completely achieved (e.g., starting at the second in the L range), at least a speed change function under manual control can be maintained.

When a failure has occurred in the driving control of the stepping motor 12, the ECU for AT 70 cuts off the drive of the stepping motor 12 and forcedly shifts the cam shaft 1 to the fail-safe position (i.e., the fourth speed position) by means of the return spring 54. This process is shown by a flowchart in FIG. 7B. When the ECU for AT 70 determines that the driving control of the stepping motor 12 has failed, a determination based on the error signals received from various sensors, the ECU for AT 70 releases the stepping motor 12 so that it is in a free state and shifts the cylindrical cam shaft 1 to the fail-safe position (i.e., the fourth speed position) using the extending force of the return spring 54. In this state, one of the manual ranges of P, R, N, D, 2 and L is selected by operating the gearshift 500, the cylindrical cam shaft 1 is rotated by the connecting part 11, and the positions of the respective spool valves 2–8 are controlled.

In the above arrangement, regardless of the speed change position in which a failure has occurred, speed change shock can be eased. For example, if a failure has occurred when the gearshift 500 is in the 2 range and the gear shift is in the second speed position, the cam shaft 1 will shift from the second speed position at the time of failure to the third speed position and then to the fourth speed position without shifting to the first speed position side, i.e., the low-speed side. Since the cam shaft 1 will shift gradually to the high-speed side, there is no speed shift shock due to inertial engine braking as seen in normal downshift operations.

The return spring 54 may be provided at the exterior of the housing 28 or replaced by another mechanism producing a similar force. In the arrangement where automatic control and manual control are interchanged, it is also possible that wherever the return spring 54 is provided, the return spring 54 accumulates enough force to rotate the cam shaft 1 to the stopper position 1a. Furthermore, it is also possible that the cam shaft 1 is returned by the force of the stepping motor 1.

For these reasons, in the positions of the spool valves 2–8 in the event of failure, the cam shaft 1 is shifted to the stopper position 1a by the force of the return spring 54, the fail-safe position may separately be provided instead of the fourth speed position which is generally used as the fail-safe position of the cam shaft 1. In FIG. 4, the fail-safe position is shown in a column next to the fourth speed column. Most failures occur unexpectedly, and possible causes thereof can not be predicted. In some cases, the oil pressure adjustment function malfunctions, and in such an event, the oil pressure will vary sharply and operation of the multiple disc clutches $C_0$–$C_2$, which are hydraulically operated, will vary sharply. As a result, a sharp speed change, or speed change shock, will be caused. Therefore, it is necessary to provide some measures to avoid the occurrence of speed change shock. As fail-safe mode positions to avoid the speed change shock, the respective spool valves 2–8 in the connected state are fixed to a half-opened position, which is not generally used during regular operations, so that sharp oil pressure changes due to the failure can be avoided. This arrangement is particularly effective for an automatic transmission used in a system which directly controls the clutch pressure as in the present invention. Since normal control is maintained since oil pressure remains in ample supply even in the half-connected state, there is no problem created in setting the respective spool valves 2–8 to the half-connecting state.

Figure 8A:
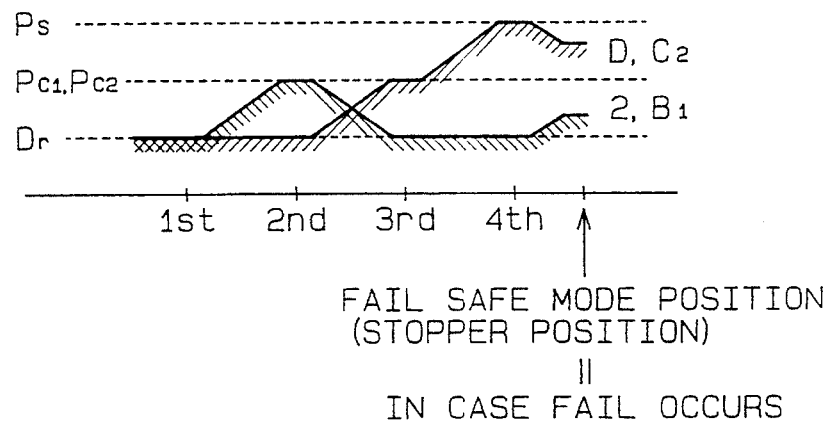
FIG. 8A is a schematic view showing a cam shaft with a fail-safe mode position according to the first embodiment of the present invention.
Figure 8B:
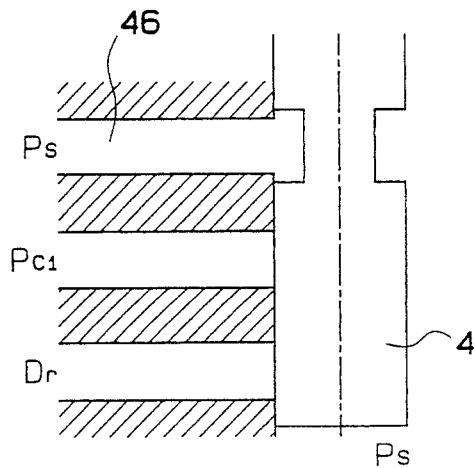
FIGS. 8B and 8C show the operation of a spool valve according to the first embodiment of the present invention.
Figure 8C:
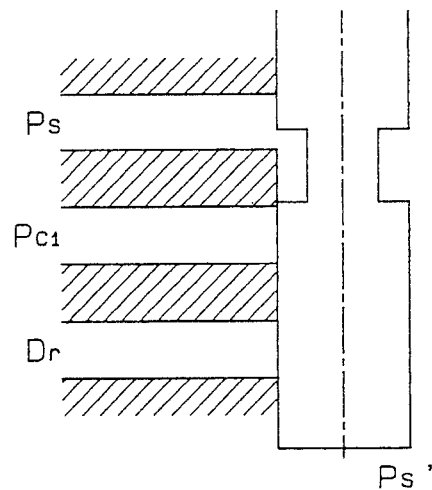

FIG. 8A shows a fragmentary cross-sectional view of the convex and concave parts on the outer periphery of the cam shaft 1 cut in the axial direction thereof, in which the convex and concave parts are used for determining the fail-safe positions of the respective spool valves as described above. The abscissa indicates the axial direction of the cam shaft 1 with respect to the first speed to fourth speed positions and the fail-safe positions. The ordinate indicates the spool valve positions as positions connected to the respective oil pressure connecting passages, i.e., the drain pressure port $D_r$, the control pressure ports $P_{c1}$ and $P_{c2}$, and the line pressure port $P_s$ in order from bottom to top. The hatched graphs in this figure indicate the spool valve groove positions when the cam shaft 1 is shifted in the axial direction with respect to the D range in the multiple disc clutch $C_2$ (spool valve 4) and the second range in the multiple disc brake $B_1$ (spool valve 7). The spool valve 4 in the fourth speed position is, as shown in FIG. 8B, in a position where the groove of the spool valve 4 fully coincides with the line pressure connecting passage 46. When the spool valve 4 is shifted to the fail-safe position, the groove of the spool valve 4 is, as shown in FIG. 8C, shifted downward and half-connected (half-opened) to the line pressure connecting passage 46, thereby narrowing the opening of the spool valve 4 to control the pressure change. As a result, even if the pressure varies sharply in the event of a failure, the pressurized oil can gradually flow in and out through the narrowed opening part to avoid speed change shock due to the speed change to the fail-safe position.

Figure 9A:
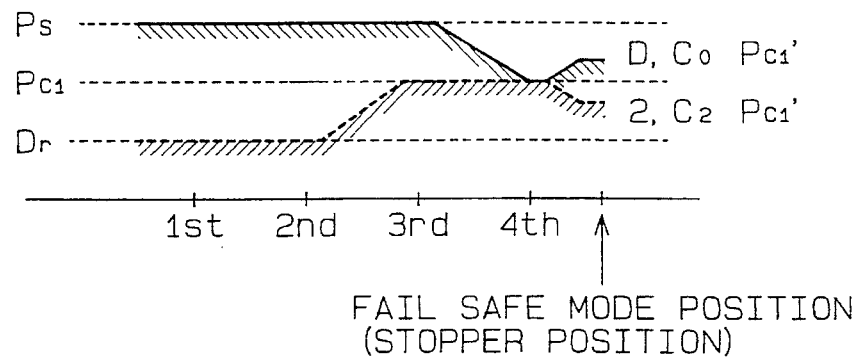
FIG. 9A a schematic view showing the cam shaft of FIG. 8A with a fail-safe mode position.
Figure 9B:
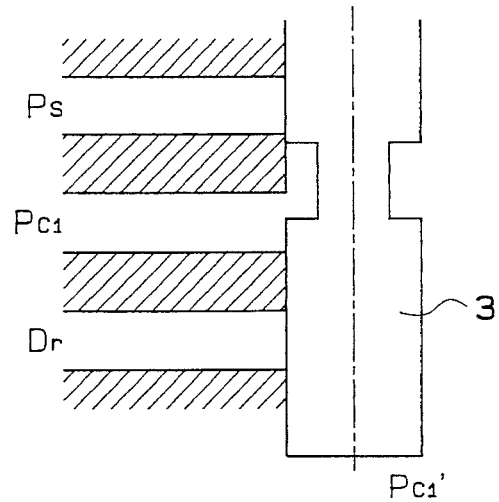
FIGS. 9B and 9C show the operation of another spool valve other than FIGS. 8A to 8C.
Figure 9C:
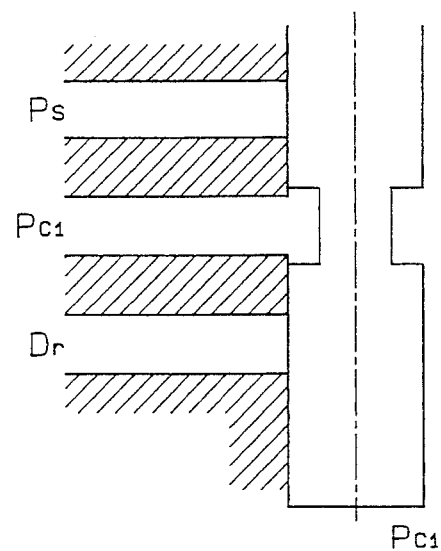
Figure 10A:
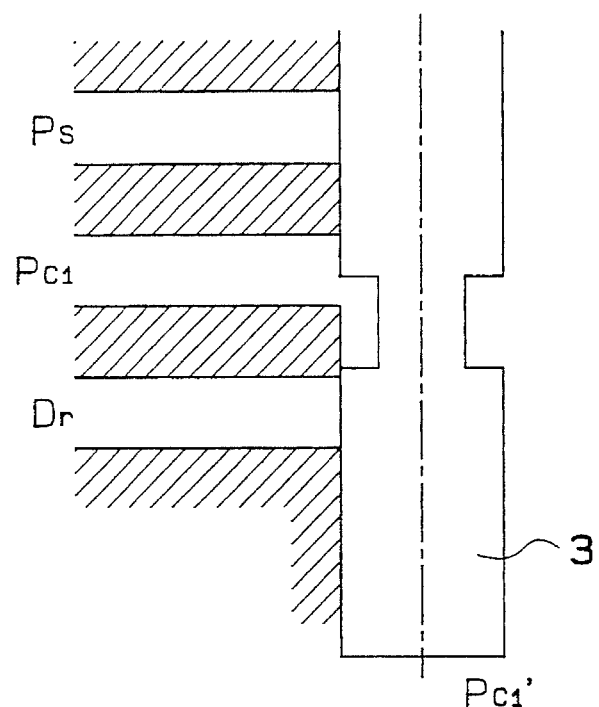
FIGS. 10A and 10B are illustrative views of another spool valves other than the spool valves of FIGS. 8A to 8C and 9A to 9C.
Figure 10B:
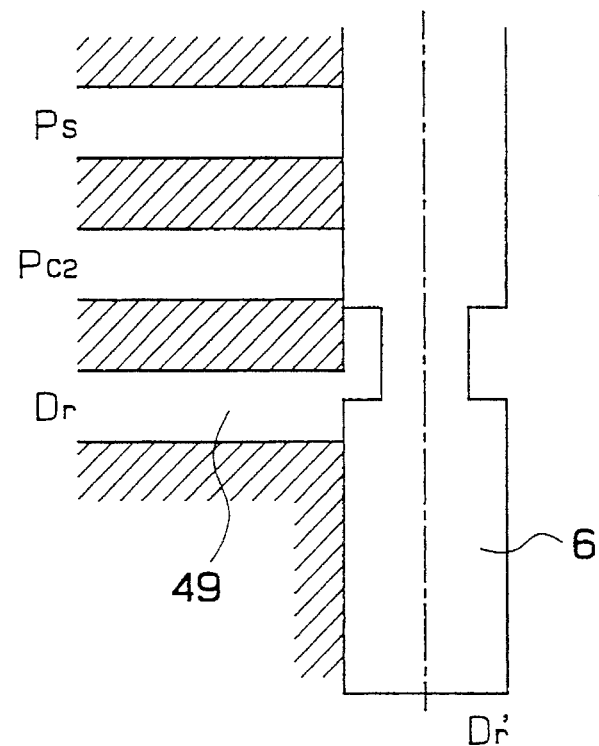

The position shown in FIG. 8C is applicable not only to the D range in the multiple disc clutch $C_2$ (spool valve 4) but also to any other spool valve as long as the fourth speed position is connected to the line pressure port ($P_s$). In the same way, FIG. 9A shows the groove positions of the spool valves 3 and 4 of the multiple disc clutch $C_0$ in the D range and multiple disc clutch $C_2$ in the 2 range respectively. In the event of a failure, the spool valve 3 will be shifted to a position shown in FIG. 9B, and in the normal condition, the spool valve 3 is in a position shown in FIG. 9C. When the spool valve 3 is connected to the control pressure connecting passage 47, the spool valve 3 can be shifted in either direction to produce the half-opened state, the selection of which depends on which direction is preferable relative to the design of the cam shaft 1. The position of the spool valve 3 in the event of a failure, however, is set to a position where the fourth speed position is in the half-opened state, which is a conventional fail-safe position, since a larger connecting hole is not required in the fourth speed position; thus, the shift amount of the spool valve 3 can be saved. In FIG. 10A, when the spool valve 3 in the 2 range is in the fail-safe position, the spool valve 3 is shifted downward and the half-opened state is produced. The spool valve 6 in the 2 range, which is in a position where the spool valve 6 in the fourth mode is connected to the drain pressure connecting passage 49 in FIG. 8A, is shifted upward by a small amount as shown in FIG. 10B since the spool valve 6 can not move downward any further.

Of course, in the cam shaft 1 with the above fail-safe mode positions, there is no need to always set the spool valves 2–8 to the respective fail-safe mode positions, but the fourth mode position may be used with a motor-driven shift.

The spool valves 2–8 may also be arranged in another fail-safe configuration so that, if the oil passage ports or groove positions of the respective spool valves 2–8 should be locked in positions where the oil passage ports or grooves are not connected to any of the oil pressure supply passages 46–51, the oil passage ports or grooves are designed to be at least wide enough to slightly be connected to the respective oil pressure connecting passages 46–51.

It is preferable that the line pressure connecting passage 46, the control pressure connecting passage 47 and the drain pressure connection passage 48 are arranged in order of remoteness from the cam shaft 1. This is because the projection ratios of the pins 14–20 to the side of the cam shaft 1 vary according to the positions of the spool valves 2–8 and the forces that thrust back the pins 14–20 vary according to the difference in the internal pressures of the spool valves 2–8. This will be further described in the following paragraphs. It should be noted that the arrangement of the pressure connecting passages 46–48 is not critical, and the above effects can be achieved with similar arrangements, whether the arrangement is of only automatic control or of manual control.

Figure 11B:
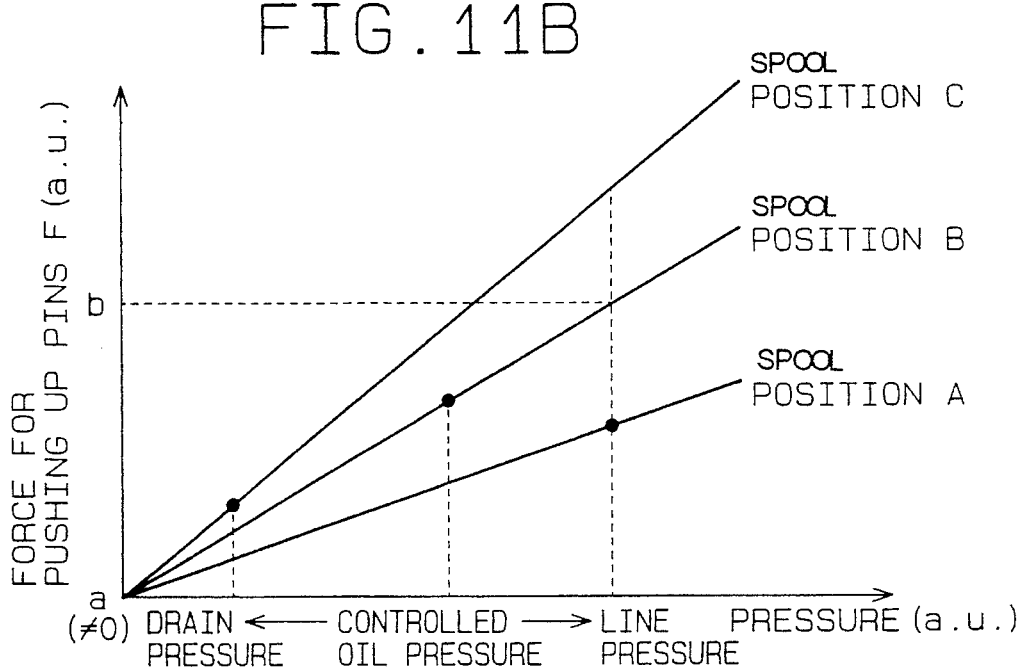
FIG. 11B is a graph of differential driving force according to the disposition of pressure oil supply connecting passages in an AT according to the present invention.

FIGS. 11A and 11B take the spool valve 5 by way of example and show the variance in the force required for thrusting up the pin 17 according to the change in oil pressure, to which force the groove of the cam shaft 1 is subjected differently according to the positions A–C of the respective oil pressure connecting passages 46–48 and which force is required for shifting the cam shaft 1. When the groove 5a of the spool valve 5 is in the position C, i.e., when the spool valve 5 is in the lowest position and nearest to the cam shaft 1, the pin 17 is projected the farthest to the side of the cam shaft 1. In this position, when the cam shaft 1 shifts and thrusts up the pin 17, the pin 17 is subjected to rotational moment with a point d used as a fulcrum. Therefore, the farther the pin 17 projects, the more the pin 17 is subjected to a perpendicular force. In this case, the larger the force required for thrusting up the pin 17, the larger the perpendicular force on pin 17.

Accordingly, in an oil pressure connecting mode that reduces the pressure on the pin 17 in the position C where the pin 17 projects the most, the force required for thrusting up the pin 17 can be reduced, and consequently the perpendicular force on pin 17 can also be reduced. Specifically, when the groove 5a of the spool valve 5 is shifted from position A to position B and to position C and related to the connected supply oil pressure as shown by black dots in FIG. 11B, the maximum force required for thrusting up the pin 17 is only the maximum control oil pressure indicated by a point b on which the line pressure and the line of position B intersect each other. In other words, by allocating the connecting passage for the line pressure, the highest pressure, to the position A and the connecting passage for the drain pressure, the lowest pressure, to the position C, the force required for driving the cam shaft 1 can be reduced, and consequently the pin 17 can be protected from being deformed. Furthermore, the force for driving the stepping motor 12, the driving source for the cam shaft 1, can also be reduced, and consequently the whole system can be downsized. Moreover, the force required for manually operating the gearshift 500 can be reduced.

Figure 12:
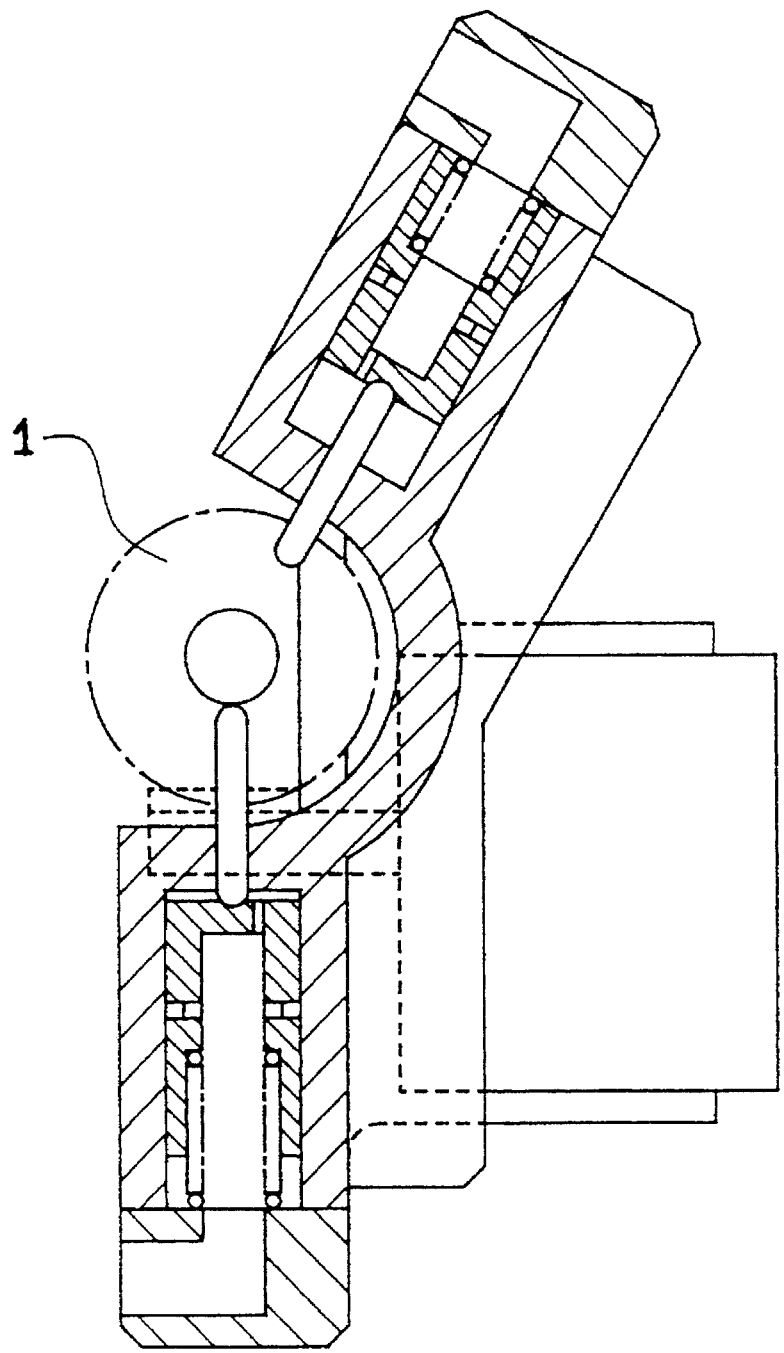
FIG. 12 is a cross-sectional view of an integrated valve according to a second embodiment of the present invention which has an approximate V-shape.

Since the position of the spool valves 2–8 disposed at both sides of the cam shaft 1 have a relatively high degree of freedom, various arrangements of the valves 2–8 besides the arrangement shown in FIG. 1 are possible. For example, FIG. 12 shows a modification of the arrangement shown in FIG. 6A where the spool valves 2–8 are disposed at both sides of the cam shaft 1 and angled with respect to the axis of the cam shaft 1 instead of disposing the spool valves 2–8 on the same plane. Another modification (not shown) is that all the spool valves 2– 8 are disposed in a row on one side of the cam shaft 1 to form a longitudinal arrangement. Particularly, these modifications can be compactly installed within the oil pan, for example, which only provides a small amount of room for installation, according to the configuration of the transmission (300 shown in FIG. 2) of the AT body.

When the spool valves 2–8 disposed at one side of the cam shaft 1 are rearranged to be disposed in a plurality of rows on a plane, the cam shaft 1 can be replaced by a cam plate to perform the same function. The cam plate is a linear motion mechanism in two axial directions on the plane thereof. Specifically, the cam plate is provided with convex and concave parts on the surface, which is equivalent to the cam shaft 1 unfolded onto a plane, and spool valves 2–8 are disposed on the cam plate through the pins 14–20. When the cam plate moves in a line along the first direction, which corresponds to the axial direction of the cam shaft 1, and in the second direction, which is different from the first direction (e.g., at right angles to the first direction), on the plane thereof by means of rack and pinion or other means, manual control and automatic control of the above embodiment can be implemented. More specifically, the spool valves 2–8 are disposed in parallel with each other as required and specified on the cam plate; the speed change among the first speed, second speed, third speed and fourth speed positions is made by automatically driving the cam plate using the rack and pinion mechanism of the stepping motor 12 as the first direction; and the speed change shift is manually operated through the manual control connected to the gearshift 500 by means of the rack and pinion mechanism as the second direction. This cam plate may be a completely flat plate, or it may be a curved plate having an actuate cross section as a part of the cylindrical side, which may be thought of as an intermediate variation between the cam shaft 1 and the cam plate.

In the above first embodiment, manual control is implemented through the rotational motion of the cylindrical cam shaft 1 and automatic control is through the linear motion thereof in the axial direction. Of course, even if manual control is implemented through the linear motion of the cylindrical cam shaft 1 in the axial direction and automatic control is implemented through the rotational motion thereof, the same effect of the present invention as the above can be obtained. In this reverse arrangement, however, the stepping motor 12 in FIG. 1 is interlocked with the rack gear 10, and is mechanically connected to the gearshift 500 through a gear disposed in the position of the stepping motor 12, which position is shown in FIG. 1. Furthermore, besides the mechanism shown in FIG. 1, it is also possible that the rotation of the stepping motor 12 for automatic control is directly connected to the cam shaft 1 and manually slid together by the mechanism of the rack 52. Moreover, the size of the cylindrical cam shaft 1 may not be confined to the size indicated in FIG. 1. For example, the diameter of the cylindrical cam shaft 1 may be enlarged to such an extent that the cylindrical cam shaft 1 is transformed to be almost a cylindrical drum. In addition, the shape of the spool valves 2–8 are not necessarily cylindrical but be of any shape, as long as the hydraulic valve function as described in the above can be maintained.

FIG. 13 shows a cross-sectional view of the integrated valve 60 according to a fourth embodiment of the present invention. In this embodiment, a cylindrical rotary spool 81 directly connected to a motor 85 fixed to a housing 83 is housed within the housing 32 by being fittingly installed into a freely movable slide sleeve 82 and rotatable around the spindle of the motor 85. The slide sleeve 82 is connected to a connecting mechanism (not shown), mechanically connected to the gearshift 500 for speed change, and slides in the axial direction to the speed positions of the D, 2 and L ranges and common P, R and N range. Valve plates 91–100, each of which is commonly provided with the above control pressure port, drain pressure port and oil pressure port to each friction engaging element, are disposed around the slide sleeve 82, fittingly inserted thereinto, and stacked in the axial direction. The outer peripheries of the valve plates 91–100 are supported by the housing 83.

Figure 14A:
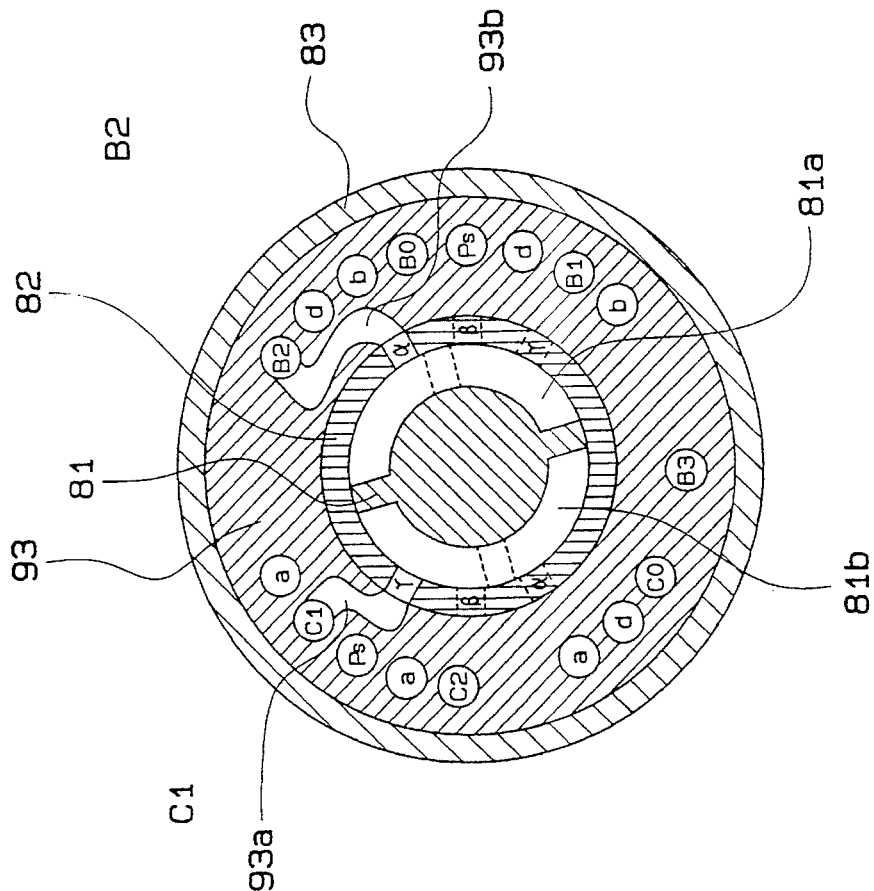
FIGS. 14A and 14B are cross-sectional views of different valve plates taken along lines 14A—14A and 14B—14B, respectively, of FIG. 13.

The outer periphery of the rotary spool 81 is provided with grooves which determine the connection to oil pressure passages to each friction engaging element, and the positions of the grooves are determined by the rotation of the motor 85. Furthermore, as shown in FIG. 14A, connecting holes I–IV are made through the slide sleeve 82 in the peripheral direction. As these connecting holes I–IV are connected to the valve plates 91–100, the connection relations of these connecting holes I–IV to the oil pressure ports provided in the respective valve plates 91–100 are switched to control the switching of the oil pressure passage to each friction engaging element.

The valve plates 91–100 inserted into the slide sleeve 82 from the side of the motor 85 in order are provided with a blind plate cover 88 in adjacency to the valve plate 100.

The blind plate cover 88 is fixed with a circlip 89 to limit the axial movement of the valve plates 91–100. The valve plates 91–100 are arranged so that the respective valve plate pairs 91 and 92, 93 and 94, 95 and 96, 97 and 98, and 99 and 100 set the specified oil pressure passages, and each pair of valve plates 91–100 shares oil pressure passages to a plurality of friction engaging elements.

The connection of oil pressure passages among the valve plates 91 to 100, the slide sleeve 82 and the rotary spool 81 will now be described using the valve plates 93 and 94 as an example.

Figure 14B:
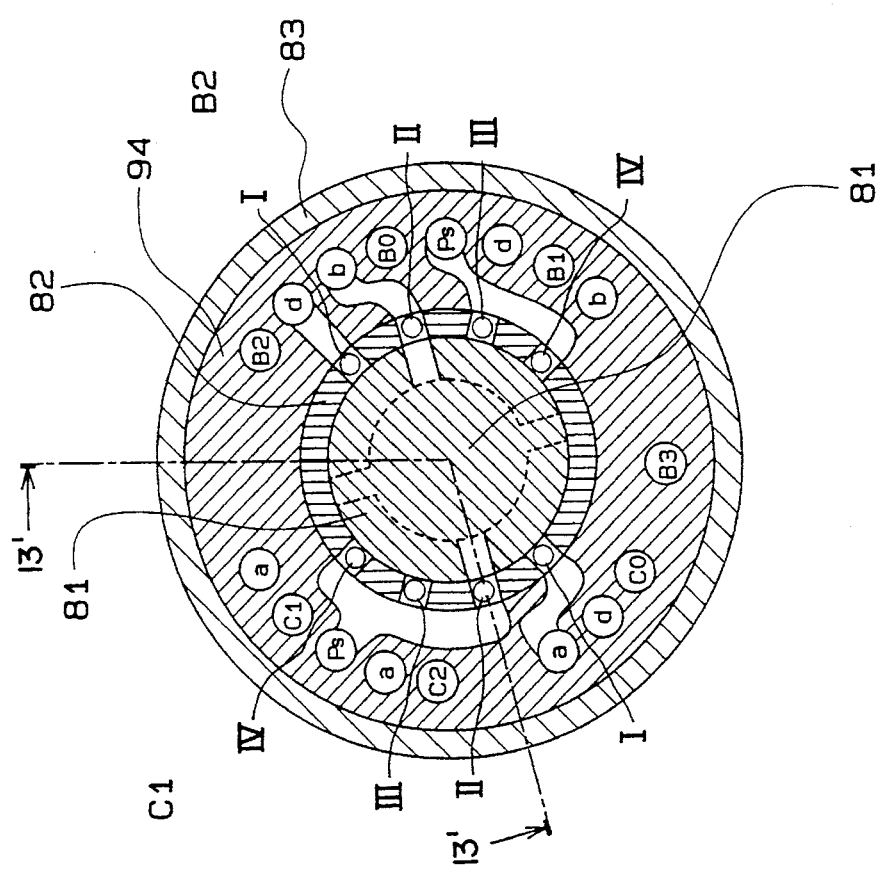

FIGS. 14A and 14B show the cross-sectional views of the valve plates 93 and 94. FIG. 14A shows a cross-sectional view of the valve plate 94 taken along line 14A—14A of FIG. 13, while FIG. 14B shows a cross-sectional view of the valve plate 93 taken along line 14B—14B of FIG. 13. Incidentally, the cross-sectional view in FIG. 13 is equivalent to a cross-sectional view taken along line 13'—13' of FIG. 14A. As shown in FIGS. 14A and 14B, the valve plates 93 and 94 are provided with a plurality of oil pressure ports, and the encircled codes denote the codes of the hydraulic units and friction engaging elements respectively. The codes $C_0$–$C_2$ denote the ports connected to the multiple disc clutches $C_0$–$C_2$ within the transmission 300 in the same way as the first embodiment, $B_0$–$B_3$ denote the ports connected to the multiple disc brakes $C_0$–$C_3$, d denotes the drain pressure port, a denotes a port corresponding to the control pressure port $P_{c1}$ of the first embodiment, b denotes a port corresponding to the control pressure port $P_{c2}$ of the first embodiment, and $P_s$ denotes a port corresponding to one of the line pressure port 35–37 of the first embodiment.

These ports $C_0$–$C_2$, $B_0$–$B_3$, d, a, b and $P_s$ are positioned in common with the other valve plates 91, 92 and 95–100 and are connected to the transmission 300 and other components by a pipe (not shown) from the outermost blind cover plate 88. Accordingly, the pressure oil is supplied to the valve plates 93 and 94 respectively through the blind cover plate 88 and these ports $C_0$–$C_2$, $B_0$–$B_3$, d, a, b and $P_s$ of the valve plates 95–100.

Since the valve plate 93 is provided with a connecting passage 93a running from the port $C_1$ to the slide sleeve 82 and a connecting passage 93b running from the port $B_2$ to the slide sleeve 82, the valve plates 93 and 94 are collectively in charge of the multiple disc clutch $C_1$ and the multiple disc brake $B_2$. The other pairs of the valve plates 91 and 92, 95 and 96, 97 and 98, and 99 and 100 are also provided with connecting passages connected to other ports in the same way.

The slide sleeve 82 is provided with the connecting holes I–IV at the left side and at the right side respectively, which are symmetrically disposed relative to one another with respect to the center of the slide sleeve 82. The rotary spool 81 is arranged to rotate ±45°. The number of connecting holes I–IV shown in FIG. 1 correspond to the speed change of the vehicle speed. The connecting hole I corresponds to the first speed position and connects to the drain pressure, the connecting hole II connects to the control pressure, and the connecting holes III and IV connected to the line pressure. FIG. 14B shows the second speed position. In this position, the oil pressure from the control port b, i.e., the control pressure port $P_{c2}$, is supplied to a notch groove provided on the rotary spool 81 through the second speed position connecting hole II of the slide sleeve 82. The notch groove connects to the connecting port $B_2$(multiple disc brake $B_2$) of the valve plate 93 through a hemispherical passage 81a and a connecting hole α of the slide sleeve 82 shown in FIG. 14B. Therefore, the multiple disc brake $B_2$ is supplied with the pressurized oil from the control pressure port $P_{c2}$. In the same way, connecting holes β and γ of the slide sleeve 82 are positioned to meet other valve plates and connect to oil pressure ports provided therein. The other connecting hole II of the slide sleeve 82 connects to the port $P_s$ and in the same way as the above, further connects to the connecting port $C_1$ of the valve plate 93 through the notch groove of the rotary spool 81, a hemispherical passage 81b shown in FIG. 14B, and the connecting hole γ of the slide sleeve 82 again. Accordingly, the line pressure from the port $P_s$ is supplied to the multiple disc clutch $C_1$. When the speed change is switched to the third speed position and to the fourth speed position, the rotary spool 81 is rotated by the motor 85 and the notch groove provided on the rotary spool 81 is positioned to meet the connecting holes III and IV of the slide sleeve 82, whereby the port connection is switched. The positions where the connecting passages of the respective valve plates 91–100 and the connecting holes α, β and γ and of the slide sleeve 82 are to be made are determined so that the connection states of the oil passages in the respective speed change positions can be related to each other as shown in FIGS. 4 and 5 of the first embodiment.

Figure 15B:
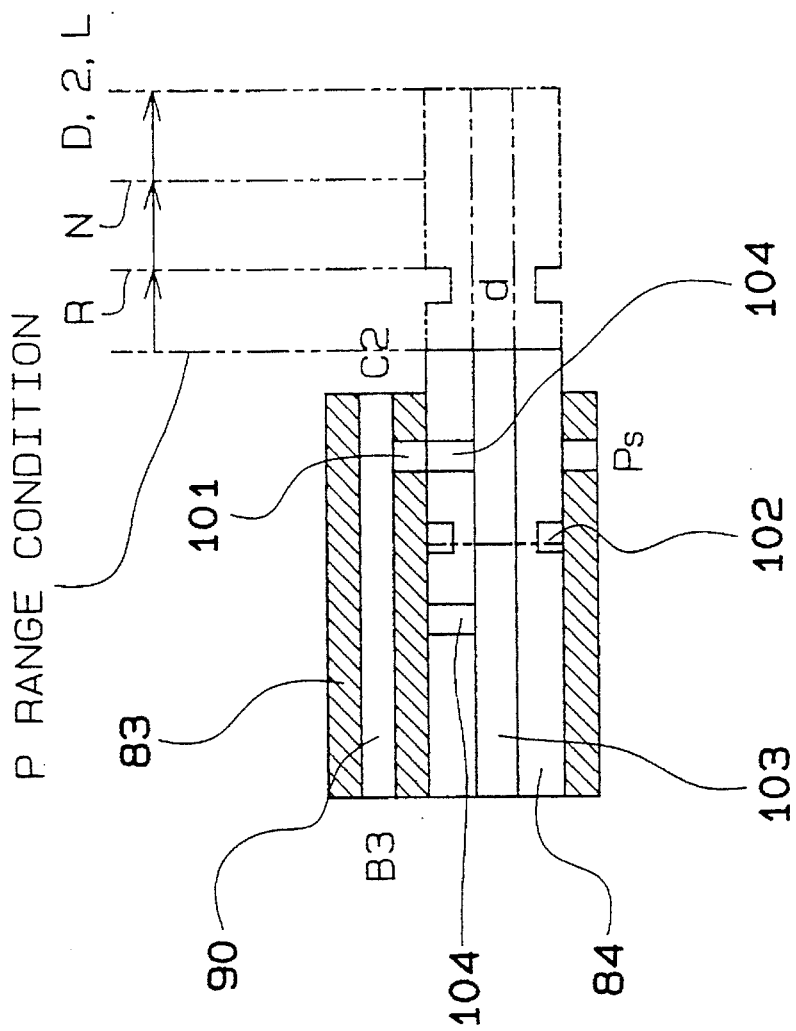
FIG. 15B is a cross-sectional view of the slide valve of FIG. 13.
Figure 15A:
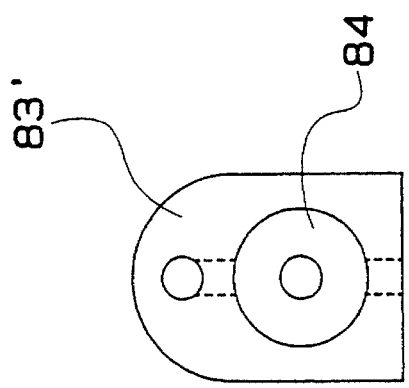
FIG. 15 is a side view of the slide valve of FIG. 13.

As shown in FIG. 13, a slide valve 84 is provided at the side under the housing 83 to form another hydraulic valve. The slide valve 84 also is connected to the connecting mechanism (not shown) and complements the slide sleeve 82; when the slide sleeve 82 is in the P, R or N range shown in FIG. 13, the slide valve 84 is interlocked with the slide sleeve 82 and takes charge of valve switching for shifting to the P, R or N range. As shown in FIGS. 15A and 15B, in the slide valve 84, the line pressure port $P_s$ or the drain pressure port d is connected to the connection ports $B_3$ and $C_2$. FIG. 15B shows the P range state. The housing 83 is provided with a passage 90 which is connected to the connecting ports $B_3$ and $C_2$ and, in addition, a connecting hole 101 which is connected to a hole into which the slide valve 84 is inserted.

The slide valve 84 is provided with a connecting hole 103 in the axial center thereof which is connected to the drain port d, and a plurality of connecting holes 104 towards the outer periphery thereof. Furthermore, the slide valve 84 is provided with an annular passage 102. In FIG. 15B, the hole 101 of the housing 83 is positioned to meet the respective connecting holes 104 of the slide valve 84. Accordingly, both the connecting ports $B_3$ and $C_2$ are connected to the drain pressure port d. In the same way, when the annular passage 102 is positioned to meet the hole 101, the connecting ports $B_3$ and $C_2$ are connected to the line pressure port $P_s$ and supplied with the line pressure.

When the gearshift is in the P, R or N range, as shown in FIG. 4, only the connection ports $B_3$ and $C_2$, of all the ports, need oil pressure switching. For this reason, the other ports $B_0$, $B_1$, $B_2$, $C_0$ and $C_1$, which are in a fixed state, can be connected at the side of the rotary spool 81 above the slide valve 84. Another advantage is that the working stroke of the rotary spool 81 can be shortened.

In the integrated valve 60 of the fourth embodiment, the rotary spool 81 is directly connected to the motor 85. The oil pressure passage is automatically controlled by rotating the motor according to the signal from the ECU for AT 70 and thereby shifting the grooves formed around the rotary spool 81. When the oil passages of the slide sleeves 82 and slide valve 84 are switched by the operation of the gearshift 500, the valves for the respective oil pressure connecting passages can manually be switched. Therefore, again in the integrated valve 60 of the fourth embodiment, both automatic and manual control can be achieved. Since the integrated valve 60 of the fourth embodiment also can implement various transmission modes by changing the valve plates 91–100, this embodiment exhibits a high degree of versatility. Since the connecting modes and other principles of the respective oil pressure passages are the same as those of the first embodiment, a detail description of the operations of the rotary spool 81 and slide sleeve 82 will be omitted for simplicity.

In general, the number of spool valves and connecting modes shown in FIG. 4 depends on the structure of the transmission 300, and the setting conditions of the spool valves and connecting modes depends on the number and quality of the multiple disc brakes and multiple disc clutches.

As described in the above, the integrated valve according to the present invention is controlled in two different ways, automatic control and manual control, and provided with a fail-safe mechanism for hydraulic control. Due to this structure, even if automatic control malfunctions due to an error, control of AT can be maintained by manual control. As a result, vehicles with the integrated valves according to the present invention can avoid any inconvenience caused particularly when vehicles are restarting on downhill sloping surfaces, uphill sloping surfaces, mountainous roads, snowy roads and the like. Furthermore, the present invention is not limited to the use of a cylindrical cam shaft and rotary spool—any the integrated valve of any hydraulic control type equipped with an automatic control mechanism and a manual control mechanism can have the same effect. Therefore, the hydraulic controller according to the present invention can provide, due to the integrated valve equipped with both an automatic control mechanism and a manual control mechanism, a light, compact and reliable AT without losing any functionality of the functions of conventional ATs.

What is claimed is:

1. A hydraulic controller for an automatic transmission which switches and controls engagement and disengagement of a plurality of friction engaging elements provided within the automatic transmission by selecting one of a plurality of speed change positions by switching oil passages selectively connectable to respective ones of said friction engaging elements, said hydraulic controller comprising:

an integrated valve which integrates a plurality of hydraulic valves for switching the oil passages selectively connectable to the respective friction engaging elements;

valve switching means for switching said plurality of hydraulic valves directly and simultaneously;

automatic hydraulic valve switching means for automatically driving and controlling said valve switching means by switching only a forward speed change position in said automatic transmission; and manual hydraulic valve switching means for manually driving and controlling said valve switching means by switching at least forward and reverse speed change positions in said automatic transmission, at least one hydraulic valve switched by said manual hydraulic valve switching means in said reverse speed change position being a hydraulic valve switched by said automatic hydraulic valve switching means in said forward speed change position.

2. A hydraulic controller for an automatic transmission, for use in a vehicle, which switches and controls engagement and disengagement of a plurality of friction engaging elements provided within the automatic transmission to implement speed change control by selecting one of a plurality of speed change positions by switching oil passages selectively connectable to respective ones of said friction engaging elements, said hydraulic controller comprising:

an integrated valve which integrates a plurality of hydraulic valves for switching the oil passages selectively connectable to the respective friction engaging elements;

valve switching means for switching said plurality of hydraulic valves directly and simultaneously;

automatic hydraulic valve switching means for automatically driving and controlling said valve switching means responsive to a driving controller which controls driving of said vehicle;

manual hydraulic valve switching means for manually driving and controlling said valve switching means;

determining means for determining whether a speed change control is normal; and fail-safe positioning means for positioning said hydraulic valves to a preset fail-safe position when said determining means determines that the speed change control is in a fail state, wherein said preset fail-safe position is near a fastest speed position of the plurality of speed change positions and throttles said oil passages to respective friction engaging elements in said fastest speed change position.

3. The hydraulic controller for an automatic transmission according to claim 2, wherein said preset fail-safe position is in a fastest speed position of the plurality of speed change positions.

4. The hydraulic controller for an automatic transmission according to claim 2, further comprising forced hydraulic valve switching means for forcedly switching said valve switching means and shiftably driving said hydraulic valves when said automatic hydraulic valve switching means fails and driving of said automatic hydraulic valve switching means is stopped so that said hydraulic valves are positioned at said preset fail-safe position.

5. The hydraulic controller for an automatic transmission according to claim 4, wherein said automatic oil passage switching means is for switching only a forward speed change position; and said manual oil passage switching means is for switching at least forward and reverse speed change positions.

6. A hydraulic controller for an automatic transmission which switches and controls engagement and disengagement of a plurality of friction engaging elements provided within the automatic transmission by selecting one of a plurality of speed change positions by switching oil passages selectively connected to respective ones of said friction engaging elements, said hydraulic controller comprising:

a plurality of valve plates including oil passages selectively connectable to said respective friction engaging elements, and respective communicating passages for providing line pressure to maintain engagement of said friction engaging elements, providing engagement pressure for engaging said friction engaging elements, and providing drain pressure for disengaging said friction engaging elements;

a cylindrical rotary spool including a plurality of communicating passages on an outer periphery of said cylindrical rotary spool for switching the oil passages selectively connectable to respective friction engaging elements;

a cylindrical sleeve fittingly disposed between at least one of said valve plates and said rotary spool for switching the oil passages selectively connectable to the respective friction engaging elements;

automatic oil passage switching means for automatically driving and controlling the oil passage switching of said rotary spool; and manual oil passage switching means for switching and controlling the oil passages by manually driving and controlling said sleeve.

7. The hydraulic controller for an automatic transmission according to claim 6, wherein said automatic oil passage switching means is for switching the oil passages by controllably driving said rotary spool in a rotational direction thereof; and said manual oil passage switching means is for switching the oil passages by controllably driving said rotary sleeve in an axial direction thereof.

* * * * *